(12) United States Patent
Shamir et al.

(10) Patent No.: US 12,471,852 B2
(45) Date of Patent: Nov. 18, 2025

(54) METHODS, SYSTEMS, AND APPARATUSES FOR ASSOCIATING DIELECTRIC PROPERTIES WITH A PATIENT MODEL

(71) Applicant: Novocure GmbH, Root (CH)

(72) Inventors: Reuven Ruby Shamir, Haifa (IL); Zeev Bomzon, Haifa (IL); Noa Urman, Haifa (IL)

(73) Assignee: Novocure GmbH, Baar (CH)

( * ) Notice: Subject to any disclaimer, the term of this patent is extended or adjusted under 35 U.S.C. 154(b) by 791 days.

(21) Appl. No.: 17/136,841

(22) Filed: Dec. 29, 2020

(65) Prior Publication Data

US 2021/0196207 A1 Jul. 1, 2021

Related U.S. Application Data

(60) Provisional application No. 62/955,752, filed on Dec. 31, 2019.

(51) Int. Cl.
*G06K 9/00* (2022.01)
*A61B 5/00* (2006.01)
*G06T 7/00* (2017.01)

(52) U.S. Cl.
CPC .......... *A61B 5/7275* (2013.01); *A61B 5/0075* (2013.01); *A61B 5/7267* (2013.01); *G06T 7/0012* (2013.01); *G06T 2207/10088* (2013.01); *G06T 2207/10104* (2013.01); *G06T 2207/10132* (2013.01); *G06T 2207/20024* (2013.01); *G06T 2207/20081* (2013.01); *G06T 2207/20084* (2013.01); *G06T 2207/30096* (2013.01)

(58) Field of Classification Search
CPC ... A61B 5/7275; A61B 5/0075; A61B 5/7267; G06T 7/0012; G06T 2207/10088; G06T 2207/10104; G06T 2207/10132; G06T 2207/20024; G06T 2207/20081; G06T 2207/20084; G06T 2207/30096
See application file for complete search history.

(56) References Cited

U.S. PATENT DOCUMENTS

| | | | |
|---|---|---|---|
| 7,565,205 B2 | 7/2009 | Palti | |
| 8,724,864 B2 * | 5/2014 | Persson | A61B 5/4312 382/128 |
| 2015/0381909 A1 * | 12/2015 | Butte | A61B 1/00045 250/578.1 |
| 2016/0283687 A1 * | 9/2016 | Kamen | G06T 19/00 |
| 2018/0296277 A1 * | 10/2018 | Schwartz | A61B 18/1492 |

(Continued)

FOREIGN PATENT DOCUMENTS

| | | |
|---|---|---|
| WO | 2018/057529 A1 | 3/2018 |
| WO | 2020/168035 A1 | 8/2020 |

OTHER PUBLICATIONS

Rashed, Essam A., Jose Gomez-Tames, and Akimasa Hirata. "Non-Uniform Conductivity Estimation for Personalized Brain Stimulation using Deep Learning." arxiv.org, Cornell University Library, 201 Olin Library Cornell University Ithaca, NY 14853, Oct. 6, 2019. (Year: 2019).*

(Continued)

*Primary Examiner* — Avinash Yentrapati
(74) *Attorney, Agent, or Firm* — McCarter & English, LLP; Michael A. Sartori

(57) ABSTRACT

Methods, systems, and apparatuses are described for associating dielectric properties with a patient model.

20 Claims, 14 Drawing Sheets

(56) References Cited

U.S. PATENT DOCUMENTS

| | | | |
|---|---|---|---|
| 2019/0117956 A1 | 4/2019 | Wenger et al. | |
| 2021/0393194 A1* | 12/2021 | Feeney | G06T 7/0012 |
| 2022/0121869 A1* | 4/2022 | Miura | G06T 7/11 |
| 2023/0079693 A1* | 3/2023 | Urklinski | G06T 7/292 |
| | | | 374/121 |
| 2023/0105139 A1* | 4/2023 | Cai | G06T 7/74 |
| | | | 374/121 |

OTHER PUBLICATIONS

Rashed, Essam A., Yinliang Diao, and Akimasa Hirata. "Learning-based estimation of dielectric properties and tissue density in head models for personalized radio-frequency dosimetry." Physics in Medicine & Biology 65.6 (2020): 065001. (Year: 2020).*

Halter, Ryan J., et al. "The correlation of in vivo and ex vivo tissue dielectric properties to validate electromagnetic breast imaging: initial clinical experience." Physiological measurement 30.6 (2009): S121. (Year: 2009).*

Ballo, et al., "Correlation of Tumor Treating Fields Dosimetry to Survival Outcomes in Newly Diagnosed 1 Glioblastoma: A Large-Scale Numerical Simulation-Based Analysis of Data from the Phase 3 EF-14 Randomized Trial," International Journal of Radiation Oncology, Biology, Physics, 2019; 104(5), pp. 1106-1113.

Rashed, et al., "Non-Uniform Conductivity Estimation for Personalized Brain Stimulation using Deep Learning," Oct. 6, 2019, 10 pages.

Rashed, et al., "Development of Accurate Human Head Models for Personalized Electromagnetic Dosimetry Using Deep Learning," Feb. 24, 2020, 47 pages.

Rashed, et al., "Learning-based Estimation of Dielectric Properties and Tissue Density in Head Models for Personalized Radio-Frequency Dosimetry," 20 pages.

Nuo, et al., "Estimation of Electrical Conductivity Distribution within the Human Head from Magnetic Flux Density Measurement," Phys. Med. Biol. 50(2005) 2675-2687.

Liu, et al., "Electrical Properties Tomography Based on B1 Maps in MRI: Principles, Applications and Challenges," IEEE Trans Biomed Eng., 2017, 64(11): 2515-2530.

* cited by examiner

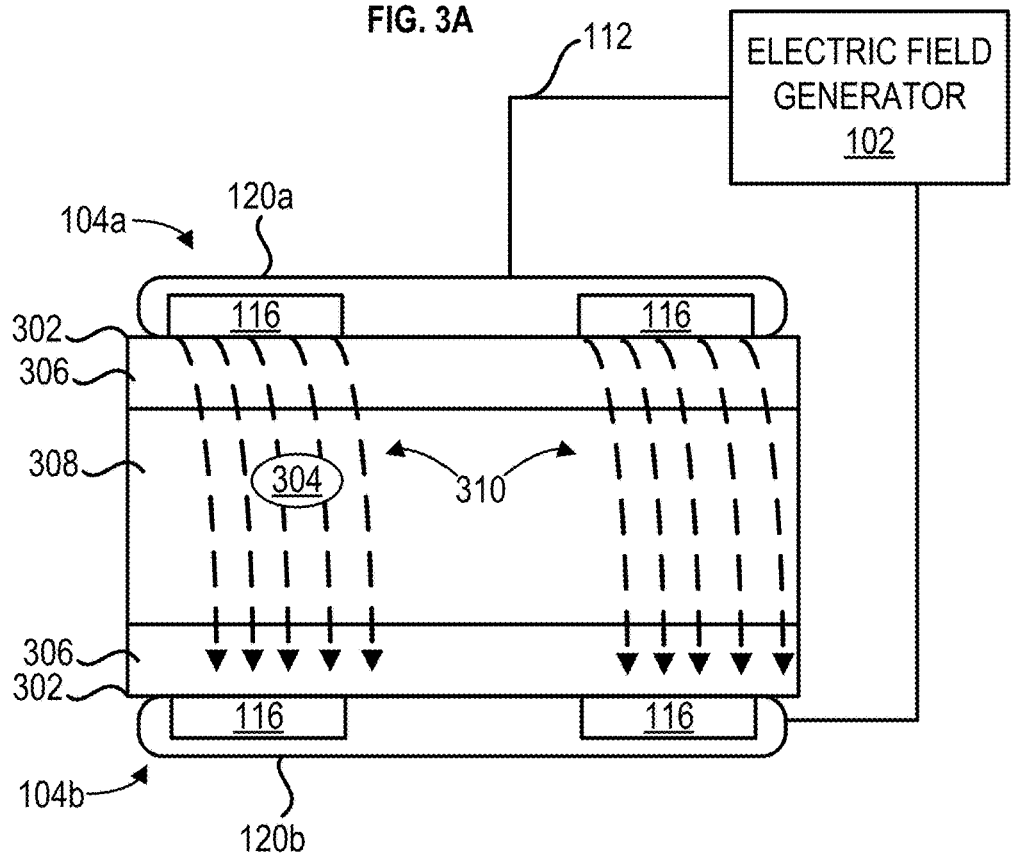
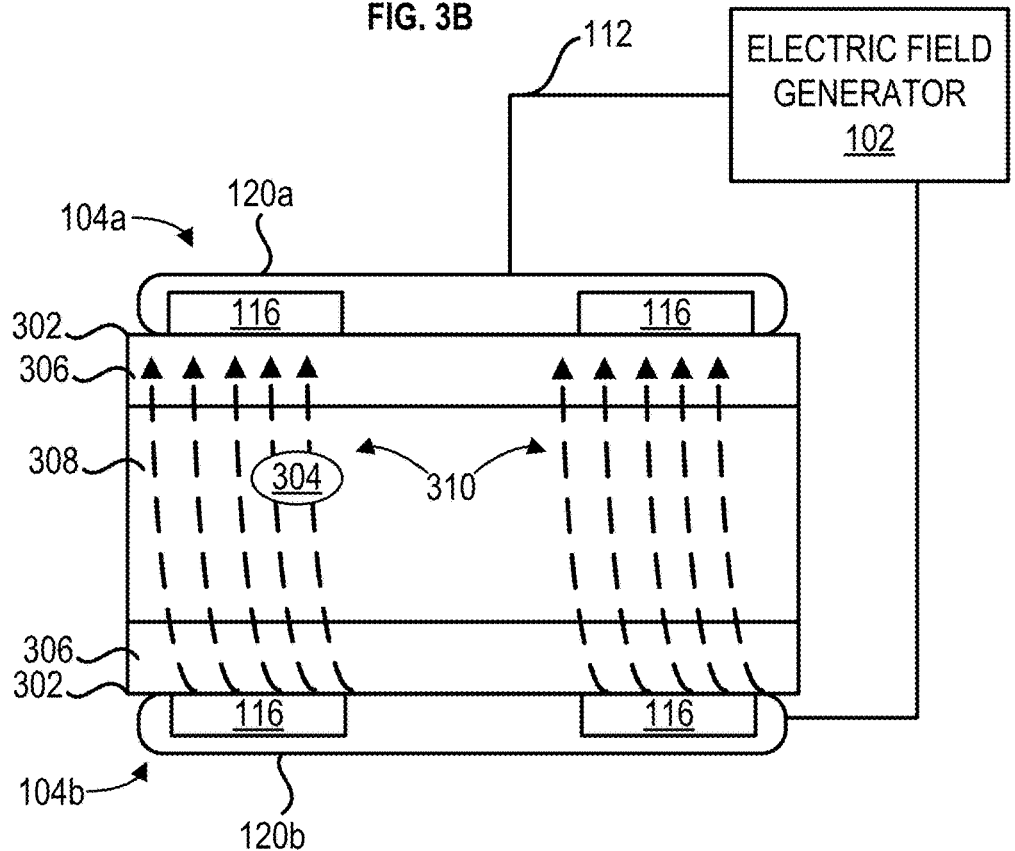

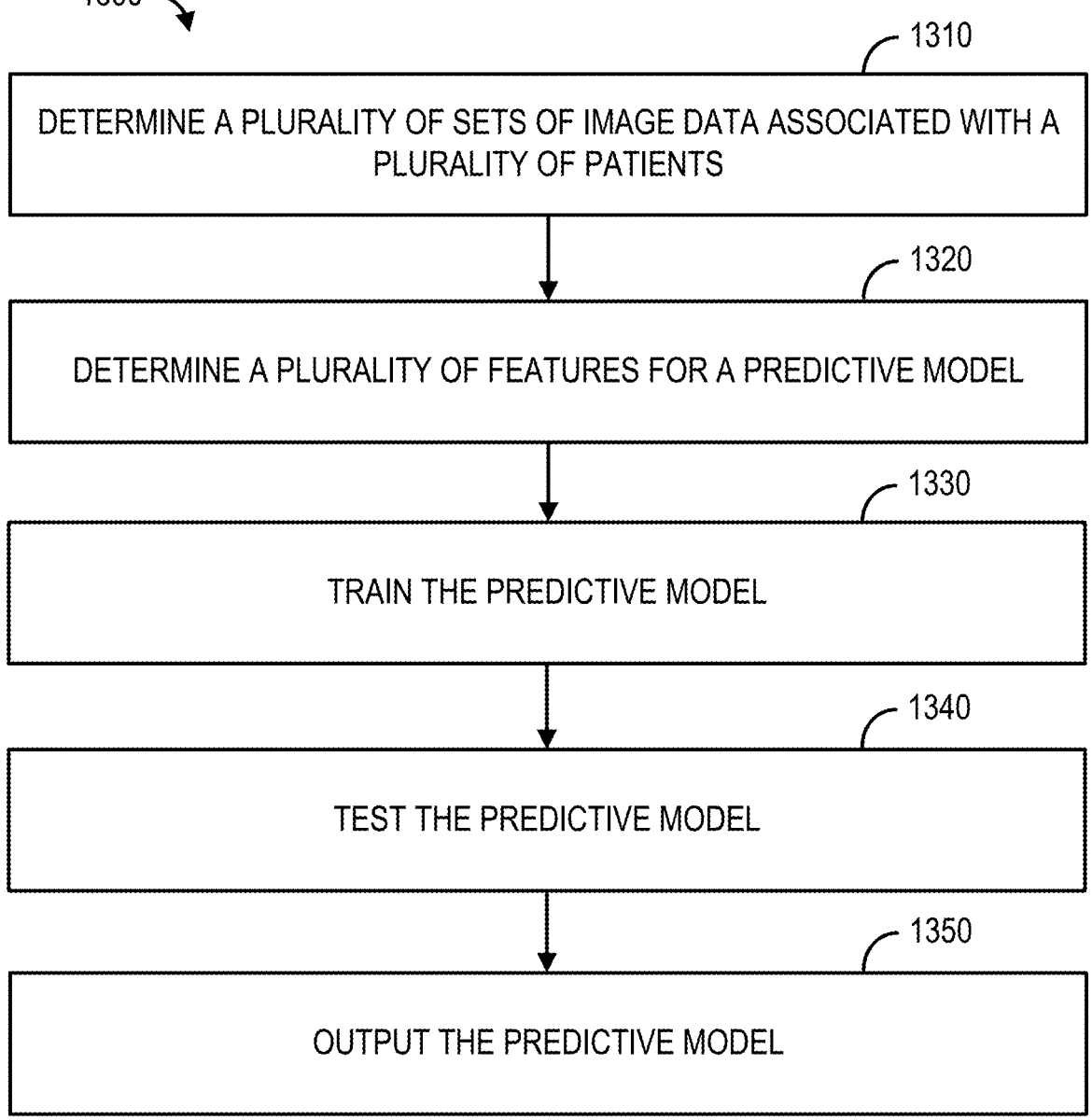

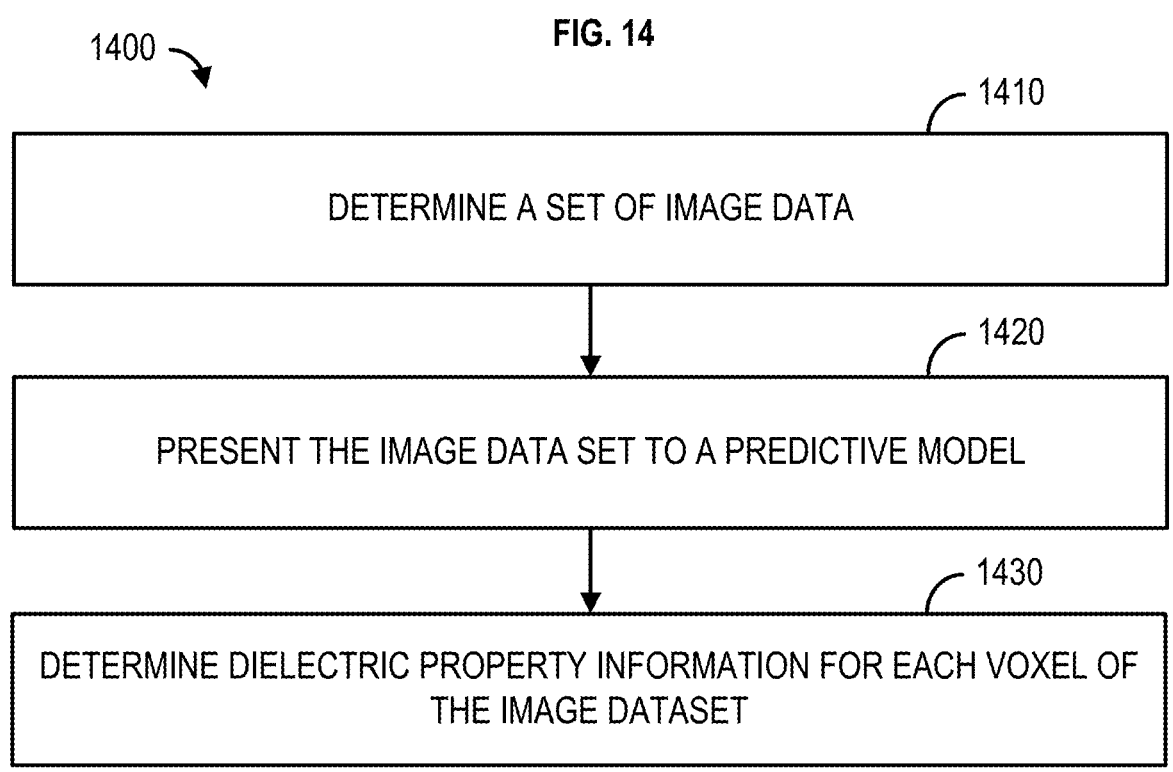

METHODS, SYSTEMS, AND APPARATUSES FOR ASSOCIATING DIELECTRIC PROPERTIES WITH A PATIENT MODEL

CROSS-REFERENCE TO RELATED PATENT APPLICATION

This application claims priority to U.S. Provisional Application No. 62/955,752 filed Dec. 31, 2019, which is herein incorporated by reference in its entirety.

BACKGROUND

Tumor Treating Fields, or TTFields, are low intensity (e.g., 1-3 V/cm) alternating electric fields within the intermediate frequency range (100-300 kHz). This non-invasive treatment targets solid tumors and is described in U.S. Pat. No. 7,565,205, which is incorporated herein by reference in its entirety. TTFields disrupt cell division through physical interactions with key molecules during mitosis. TTFields therapy is an approved mono-treatment for recurrent glioblastoma and approved combination therapy with chemotherapy for newly diagnosed patients. These electric fields are induced non-invasively by transducer arrays (i.e., arrays of electrodes) placed directly on the patient's scalp. TTFields also appear to be beneficial for treating tumors in other parts of the body. Simulating electric fields is important when planning treatment to understand whether the electric fields are being delivered to target regions within the patient so that TTFields doses (field intensity and power) are effective. Simulations require complex three-dimensional (3D) models with dielectric properties assigned to each different tissue type. Mapping dielectric properties to 3D models is performed via procedures such as Diffusion Tensor Imaging MRI data (DTI) and/or Water Electric Property Tomography (wEPT) that involve segmentation and tissue type labeling. Such segmentation and labeling procedures produce results with varying degrees of accuracy based on various tissue types within the specimen represented by the 3D model.

SUMMARY

Described are methods comprising determining a plurality of sets of image data associated with a plurality of patients, wherein each patient is associated with a set of image data derived from imaging a portion of the patient, wherein each set of image data comprises a plurality of voxels, wherein each voxel of the plurality of voxels is labeled with dielectric property information, determining, based on a first portion of the plurality of sets of image data and the dielectric property information associated with each voxel of the plurality of voxels that correspond to the first portion of the plurality of sets of image data, a plurality of features for a predictive model, training, based on the plurality of features and the first portion of the plurality of sets of image data, the predictive model, wherein the predictive model is configured to determine dielectric property information for each voxel of a plurality of voxels associated with an image, testing, based on a second portion of the plurality of sets of image data, the predictive model, and outputting, based on the testing, the predictive model.

Also described are methods comprising determining, for a patient, a set of image data, wherein the set of image data comprises a plurality of voxels, presenting, to a predictive model trained to determine dielectric property information for each voxel of a plurality of voxels associated with an image, and determining, by the predictive model, dielectric property information for each voxel of a plurality of voxels associated with the image data set.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

To easily identify the discussion of any particular element or act, the most significant digit or digits in a reference number refer to the figure number in which that element is first introduced.

FIG. 3A and FIG. 3B illustrate an example application of the apparatus for electrotherapeutic treatment.

FIG. 13 shows an example method.

FIG. 14 shows an example method.

DETAILED DESCRIPTION

Figure 1:
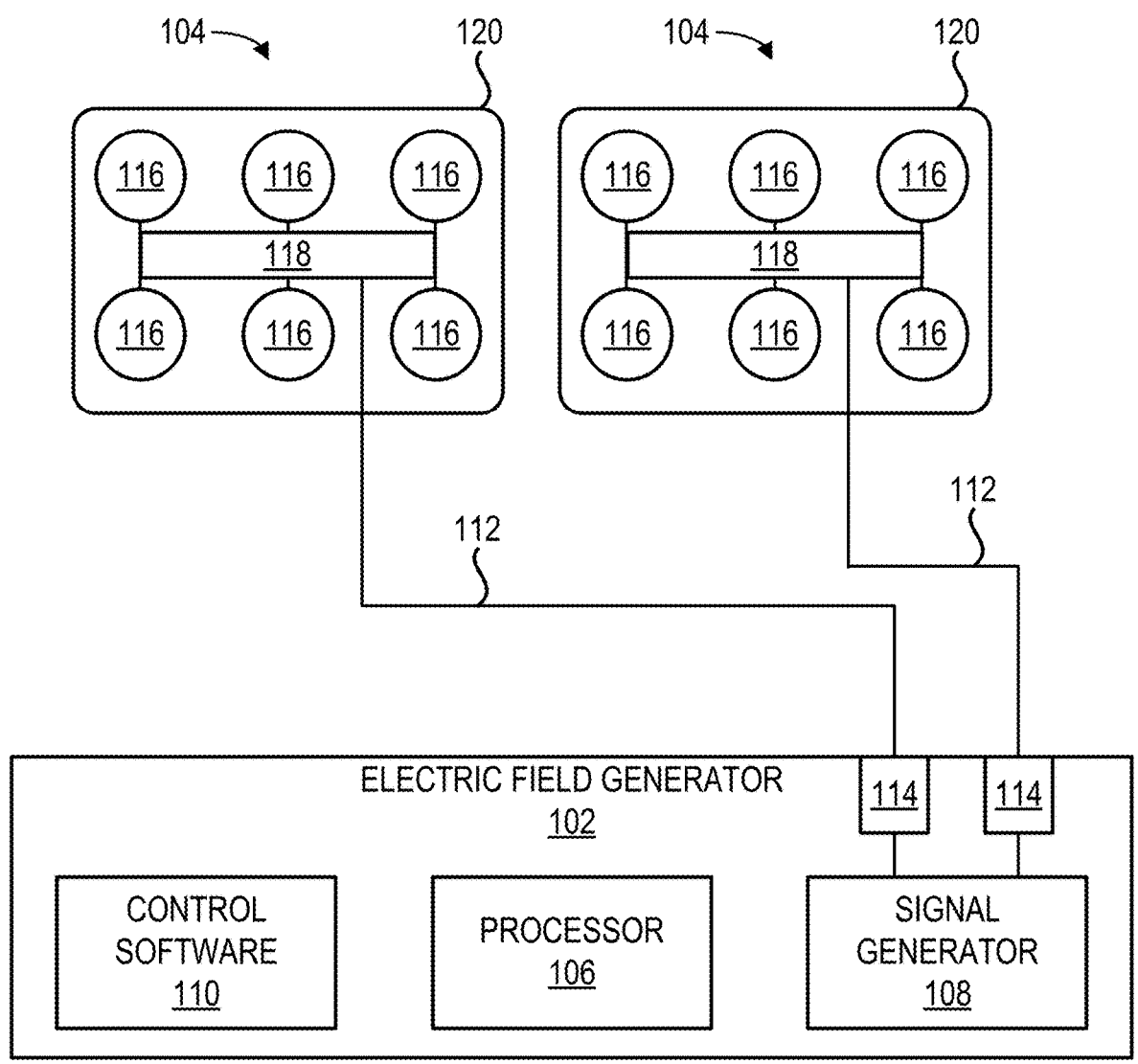
FIG. 1 shows an example apparatus for electrotherapeutic treatment.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

TTFields, also referred to herein as alternating electric fields, are established as an anti-mitotic cancer treatment modality because they interfere with proper microtubule assembly during metaphase and eventually destroy the cells during telophase and cytokinesis. The efficacy increases with increasing field strength and the optimal frequency are cancer cell line dependent with 200 kHz being the frequency for which inhibition of glioma cells growth caused by TTFields is highest. For cancer treatment, non-invasive devices were developed with capacitively coupled transducers that are placed directly at the skin region close to the tumor, for example, for patients with Glioblastoma Multiforme (GBM), the most common primary, malignant brain tumor in humans.

Because the effect of TTFields is directional with cells dividing parallel to the field affected more than cells dividing in other directions, and because cells divide in all directions, TTFields are typically delivered through two pairs of transducer arrays that generate perpendicular fields within the treated tumor. More specifically, one pair of transducer arrays may be located to the left and right (LR) of the tumor, and the other pair of transducer arrays may be located anterior and posterior (AP) to the tumor. Cycling the field between these two directions (i.e., LR and AP) ensures that a maximal range of cell orientations is targeted. Other positions of transducer arrays are contemplated beyond perpendicular fields. In an embodiment, asymmetric positioning of three transducer arrays is contemplated wherein one pair of the three transducer arrays may deliver alternating electric fields and then another pair of the three transducer arrays may deliver the alternating electric fields, and the remaining pair of the three transducer arrays may deliver the alternating electric fields.

In-vivo and in-vitro studies show that the efficacy of TTFields therapy increases as the intensity of the electric field increases. Therefore, optimizing array placement on the patient's scalp to increase the intensity in the diseased region of the brain is standard practice for the Optune system. Array placement optimization may be performed by "rule of thumb" (e.g., placing the arrays on the scalp as close to the tumor as possible), measurements describing the geometry of the patient's head, tumor dimensions, and/or tumor location. Measurements used as input may be derived from imaging data. Imaging data is intended to include any type of visual data, for example, single-photon emission computed tomography (SPECT) image data, x-ray computed tomography (x-ray CT) data, magnetic resonance imaging (MRI) data, positron emission tomography (PET) data, data that can be captured by an optical instrument (e.g., a photographic camera, a charge-coupled device (CCD) camera, an infrared camera, etc.), and the like. In certain implementations, image data may include 3D data obtained from or generated by a 3D scanner (e.g., point cloud data). Optimization can rely on an understanding of how the electric field distributes within the head as a function of the positions of the array and, in some aspects, take account for variations in the electrical property distributions within the heads of different patients.

FIG. 1 shows an example apparatus 100 for electrotherapeutic treatment. Generally, the apparatus 100 may be a portable, battery or power supply operated device which produces alternating electric fields within the body through non-invasive surface transducer arrays. The apparatus 100 may comprise an electric field generator 102 and one or more transducer arrays 104. The apparatus 100 may be configured to generate tumor treatment fields (TTFields) (e.g., at 150 kHz) via the electric field generator 102 and deliver the TTFields to an area of the body through the one or more transducer arrays 104. The electric field generator 102 may be a battery and/or power supply operated device. In an embodiment, the one or more transducer arrays 104 are uniformly shaped. In an embodiment, the one or more transducer arrays 104 are not uniformly shaped.

The electric field generator 102 may comprise a processor 106 in communication with a signal generator 108. The electric field generator 102 may comprise control software 110 configured for controlling the performance of the processor 106 and the signal generator 108.

The signal generator 108 may generate one or more electric signals in the shape of waveforms or trains of pulses. The signal generator 108 may be configured to generate an alternating voltage waveform at frequencies in the range from about 50 kHz to about 500 kHz (preferably from about 100 kHz to about 300 kHz) (e.g., the TTFields). The voltages are such that the electric field intensity in tissue to be treated is in the range of about 0.1 V/cm to about 10 V/cm.

One or more outputs 114 of the electric field generator 102 may be coupled to one or more conductive leads 112 that are attached at one end thereof to the signal generator 108. The opposite ends of the conductive leads 112 are connected to the one or more transducer arrays 104 that are activated by the electric signals (e.g., waveforms). The conductive leads 112 may comprise standard isolated conductors with a flexible metal shield and can be grounded to prevent the spread of the electric field generated by the conductive leads 112. The one or more outputs 114 may be operated sequentially. Output parameters of the signal generator 108 may comprise, for example, an intensity of the field, a frequency of the waves (e.g., treatment frequency), and a maximum allowable temperature of the one or more transducer arrays 104. The output parameters may be set and/or determined by the control software 110 in conjunction with the processor 106. After determining a desired (e.g., optimal) treatment frequency, the control software 110 may cause the processor 106 to send a control signal to the signal generator 108 that causes the signal generator 108 to output the desired treatment frequency to the one or more transducer arrays 104.

The one or more transducer arrays 104 may be configured in a variety of shapes and positions to generate an electric field of the desired configuration, direction, and intensity at a target volume to focus treatment. The one or more transducer arrays 104 may be configured to deliver two perpendicular field directions through the volume of interest.

The one or more transducer arrays 104 arrays may comprise one or more electrodes 116. The one or more electrodes 116 may be made from any material with a high dielectric constant. The one or more electrodes 116 may comprise, for example, one or more insulated ceramic discs. The electrodes 116 may be biocompatible and coupled to a flexible circuit board 118. The electrodes 116 may be configured to not come into direct contact with the skin as the electrodes 116 are separated from the skin by a layer of conductive hydrogel (not shown) (similar to that found on electrocardiogram pads).

The electrodes 116, the hydrogel, and the flexible circuit board 118 may be attached to a hypoallergenic medical adhesive bandage 120 to keep the one or more transducer arrays 104 in place on the body and in continuous direct contact with the skin. Each transducer array 104 may comprise one or more thermistors (not shown), for example, 8 thermistors, (accuracy ±1° C.) to measure skin temperature beneath the transducer arrays 104. The thermistors may be configured to measure skin temperature periodically, for example, every second. The thermistors may be read by the control software 110 while the TTFields are not being delivered to avoid any interference with the temperature measurements.

If the temperature measured is below a pre-set maximum temperature (Tmax), for example, 38.5-40.0° C.±0.3° C., between two subsequent measures, the control software 110 can increase current until the current reaches maximal treatment current (for example, 4 Amps peak-to-peak). If the temperature reaches Tmax+0.3° C. and continues to rise, the control software 110 can lower the current. If the temperature rises to 41° C., the control software 110 can shut off the TTFields therapy and an overheating alarm can be triggered.

Figure 2:
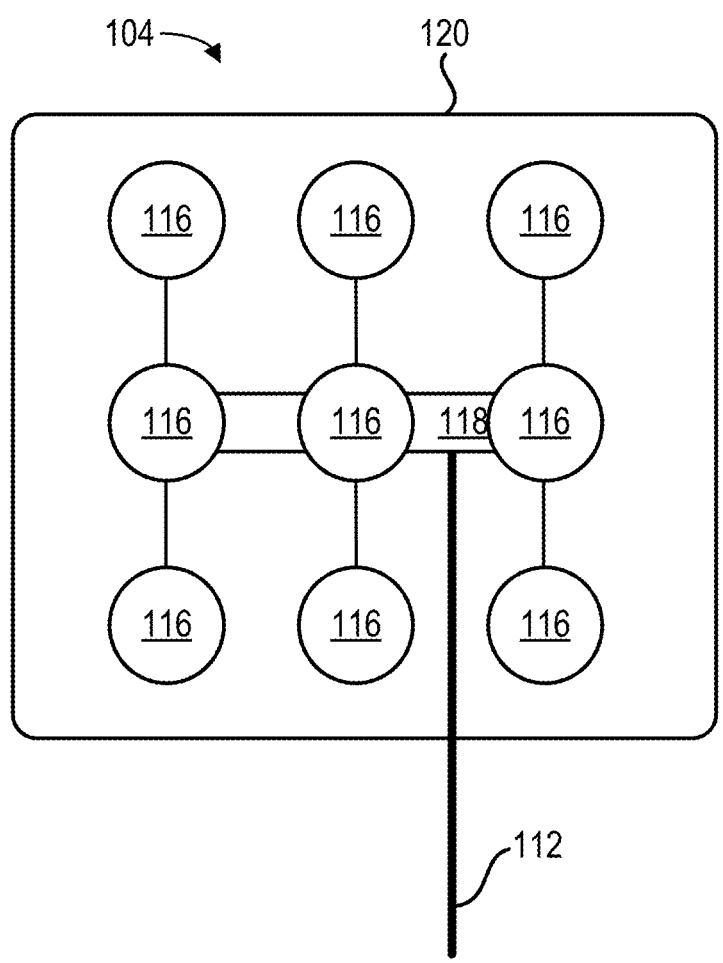
FIG. 2 shows an example transducer array.

The one or more transducer arrays 104 may vary in size and may comprise varying numbers of electrodes 116, based on patient body sizes and/or different therapeutic treatments. For example, in the context of the chest of a patient, small transducer arrays may comprise 13 electrodes each, and large transducer arrays may comprise 20 electrodes each, with the electrodes serially interconnected in each array. For example, as shown in FIG. 2, in the context of the head of a patient, each transducer array may comprise 9 electrodes each, with the electrodes serially interconnected in each array.

Alternative constructions for the one or more transducer arrays 104 are contemplated and may also be used, including, for example, transducer arrays that use ceramic elements that are not disc-shaped, and transducer arrays that use non-ceramic dielectric materials positioned over a plurality of flat conductors. Examples of the latter include polymer films disposed over pads on a printed circuit board or over flat pieces of metal. Transducer arrays that use electrode elements that are not capacitively coupled may also be used. In this situation, each element of the transducer array would be implemented using a region of a conductive material that is configured for placement against a subject/patient's body, with no insulating dielectric layer disposed between the conductive elements and the body. Other alternative constructions for implementing the transducer arrays may also be used. Any transducer array (or similar device/component) configuration, arrangement, type, and/or the like may be used for the methods and systems described herein as long as the transducer array (or similar device/component) configuration, arrangement, type, and/or the like is (a) capable of delivering TTFields to the subject/patient's body and (b) and may be positioned arranged, and/or placed on a portion of a patient/subject's body as described herein.

A status of the apparatus 100 and monitored parameters may be stored a memory (not shown) and can be transferred to a computing device over a wired or wireless connection. The apparatus 100 may comprise a display (not shown) for displaying visual indicators, such as, power on, treatment on, alarms, and low battery.

FIG. 3A and FIG. 3B illustrate an example application of the apparatus 100. A transducer array 104a and a transducer array 104b are shown, each incorporated into a hypoallergenic medical adhesive bandage 120a and 120b, respectively. The hypoallergenic medical adhesive bandages 120a and 120b are applied to skin surface 302. A tumor 304 is located below the skin surface 302 and bone tissue 306 and is located within brain tissue 308. The electric field generator 102 causes the transducer array 104a and the transducer array 104b to generate alternating electric fields 310 within the brain tissue 308 that disrupt rapid cell division exhibited by cancer cells of the tumor 304. The alternating electric fields 310 have been shown in non-clinical experiments to arrest the proliferation of tumor cells and/or to destroy them. Use of the alternating electric fields 310 takes advantage of the special characteristics, geometrical shape, and rate of dividing cancer cells, which make them susceptible to the effects of the alternating electric fields 310. The alternating electric fields 310 alter their polarity at an intermediate frequency (on the order of 100-300 kHz). The frequency used for a particular treatment may be specific to the cell type being treated (e.g., 150 kHz for MPM). The alternating electric fields 310 have been shown to disrupt mitotic spindle microtubule assembly and to lead to dielectrophoretic dislocation of intracellular macromolecules and organelles during cytokinesis. These processes lead to the physical disruption of the cell membrane and programmed cell death (apoptosis).

Because the effect of the alternating electric fields 310 is directional with cells dividing parallel to the field affected more than cells dividing in other directions, and because cells divide in all directions, alternating electric fields 310 may be delivered through two pairs of transducer arrays 104 that generate perpendicular fields within the treated tumor. More specifically, one pair of transducer arrays 104 may be located to the left and right (LR) of the tumor, and the other pair of transducer arrays 104 may be located anterior and posterior (AP) to the tumor. Cycling the alternating electric fields 310 between these two directions (e.g., LR and AP) ensures that a maximal range of cell orientations is targeted. In an embodiment, the alternating electric fields 310 may be delivered according to a symmetric setup of transducer arrays 104 (e.g., four total transducer arrays 104, two matched pairs). In another embodiment, the alternating electric fields 310 may be delivered according to an asymmetric setup of transducer arrays 104 (e.g., three total transducer arrays 104). An asymmetric setup of transducer arrays 104 may engage two of the three transducer arrays 104 to deliver the alternating electric fields 310 and then switch to another two of the three transducer arrays 104 to deliver the alternating electric fields 310, and the like.

In-vivo and in-vitro studies show that the efficacy of TTFields therapy increases as the intensity of the electric field increases. The methods, systems, and apparatuses described are configured for optimizing array placement on the patient's scalp to increase the intensity in the diseased region of the brain.

Figure 4A:
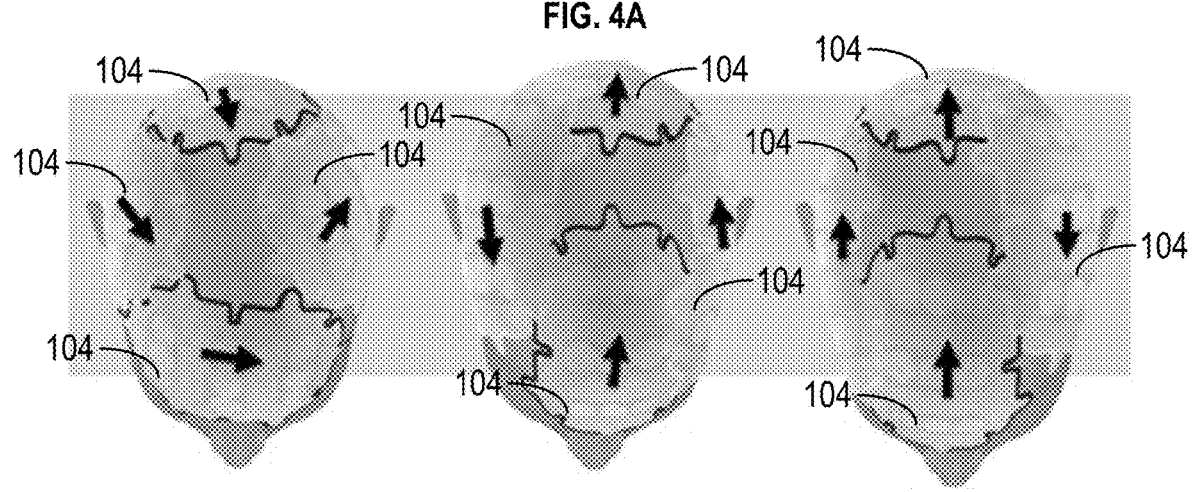
FIG. 4A shows transducer arrays placed on a patient's head.
Figure 4B:
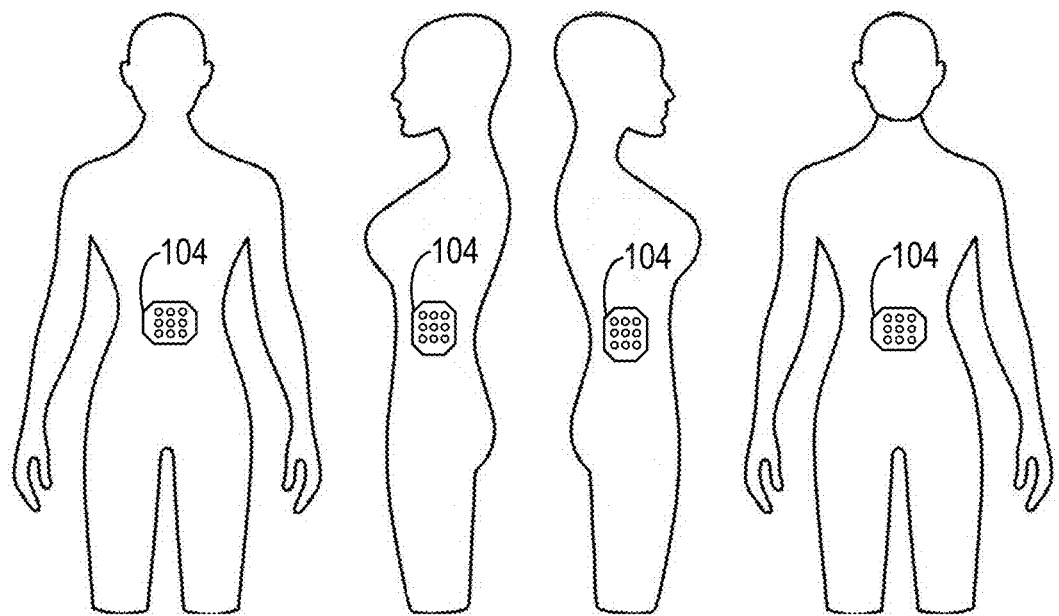
FIG. 4B shows transducer arrays placed on a patient's abdomen.
Figure 5A:
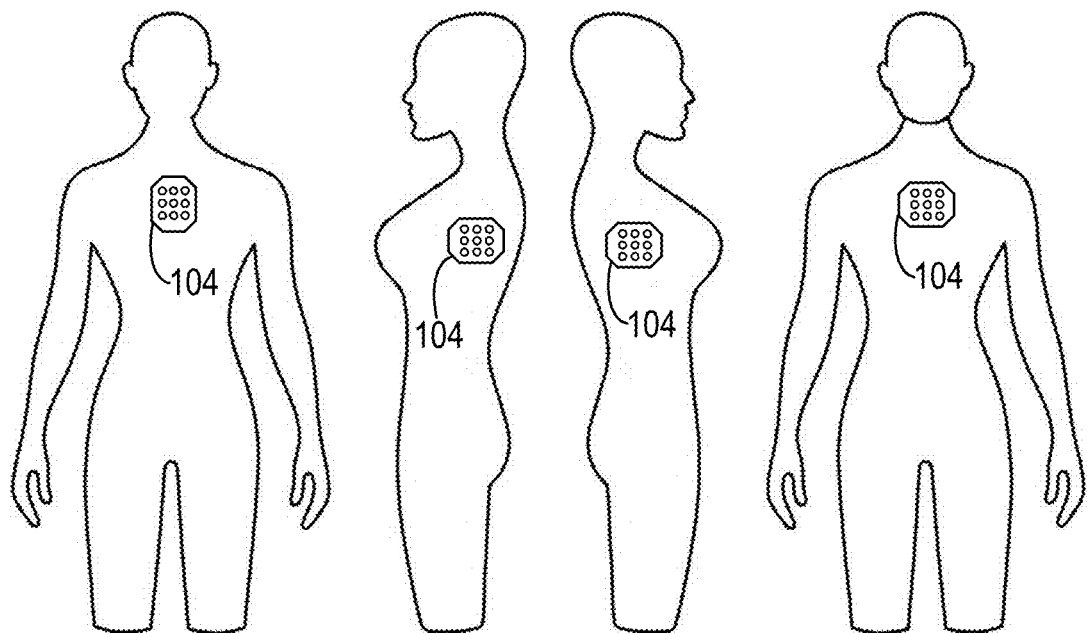
FIG. 5A, the transducer arrays placed on a patient's torso.
Figure 5B:
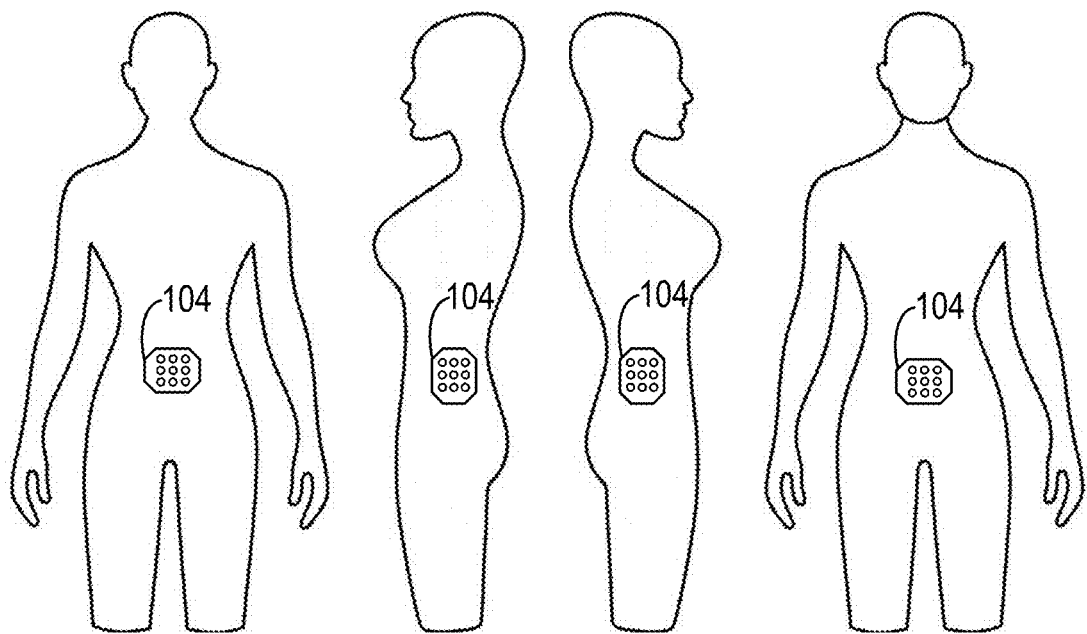
FIG. 5B shows transducer arrays placed on a patient's pelvis

As shown in FIG. 4A, the transducer arrays 104 may be placed on a patient's head. As shown in FIG. 4B, the transducer arrays 104 may be placed on a patient's abdomen. As shown in FIG. 5A, the transducer arrays 104 may be placed on a patient's torso. As shown in FIG. 5B, the transducer arrays 104 may be placed on a patient's pelvis. Placement of the transducer arrays 104 on other portions of a patient's body (e.g., arm, leg, etc.) are specifically contemplated.

Figure 6:
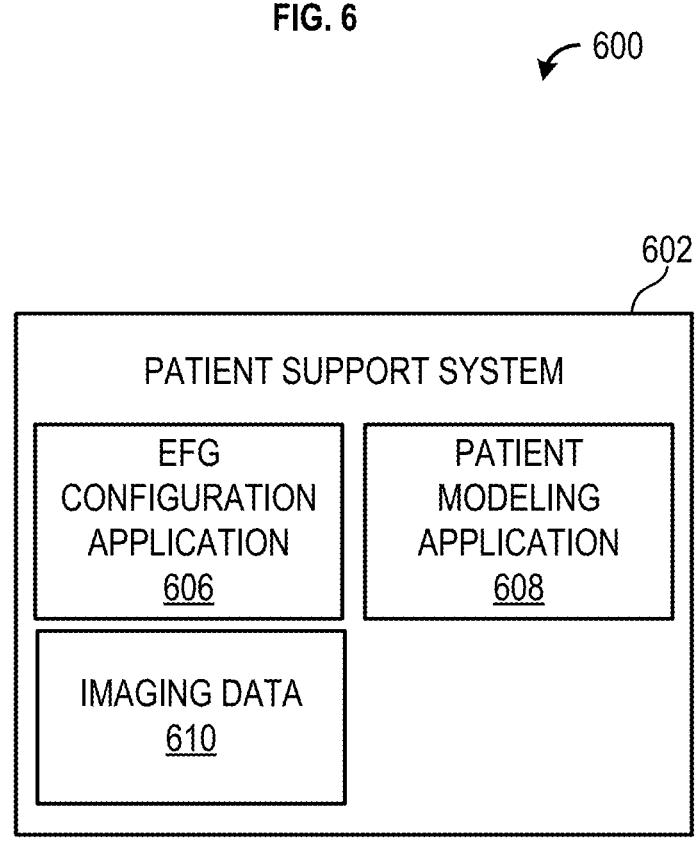
FIG. 6 is a block diagram depicting an electric field generator and a patient support system.

FIG. 6 is a block diagram depicting non-limiting examples of a system 600 comprising a patient support system 602. The patient support system 602 can comprise one or multiple computers configured to operate and/or store an electric field generator (EFG) configuration application 606, a patient modeling application 608, and/or imaging data 610. The patient support system 602 can comprise, for example, a computing device. The patient support system 602 can comprise, for example, a laptop computer, a desktop computer, a mobile phone (e.g., smartphone), a tablet, and the like.

The patient modeling application 608 may be configured to generate a three dimensional model of a portion of a body of a patient (e.g., a patient model) according to the imaging data 610. The imaging data 610 may comprise any type of visual data, for example, single-photon emission computed tomography (SPECT) image data, x-ray computed tomography (x-ray CT) data, magnetic resonance imaging (MRI) data, positron emission tomography (PET) data, data that can be captured by an optical instrument (e.g., a photographic camera, a charge-coupled device (CCD) camera, an infrared camera, etc.), and the like. In certain implementations, image data may include 3D data obtained from or generated by a 3D scanner (e.g., point cloud data). The patient modeling application 608 may also be configured to generate a three-dimensional array layout map based on the patient model and one or more electric field simulations.

To properly optimize array placement on a portion of a patient's body, the imaging data 610, such as MRI imaging data, may be analyzed by the patient modeling application 608 to identify a region of interest that comprises a tumor. In the context of a patient's head, to characterize how electric fields behave and distribute within the human head, modeling frameworks based on anatomical head models using Finite Element Method (FEM) simulations may be used. These simulations yield realistic head models based on magnetic resonance imaging (MRI) measurements and compartmentalize tissue types such as skull, white matter, gray matter, and cerebrospinal fluid (CSF) within the head. Each tissue type may be assigned dielectric properties for relative conductivity and permittivity, and simulations may be run whereby different transducer array configurations are applied to the surface of the model to understand how an externally applied electric field, of preset frequency, will distribute throughout any portion of a patient's body, for example, the brain. The results of these simulations, employing paired array configurations, a constant current, and a preset frequency of 200 kHz, have demonstrated that electric field distributions are relatively non-uniform throughout the brain and that electric field intensities exceeding 1 V/cm are generated in most tissue compartments except CSF. These results are obtained assuming total currents with a peak-topeak value of 1800 milliamperes (mA) at the transducer array-scalp interface. This threshold of electric field intensity is sufficient to arrest cellular proliferation in glioblastoma cell lines.

Figure 7:
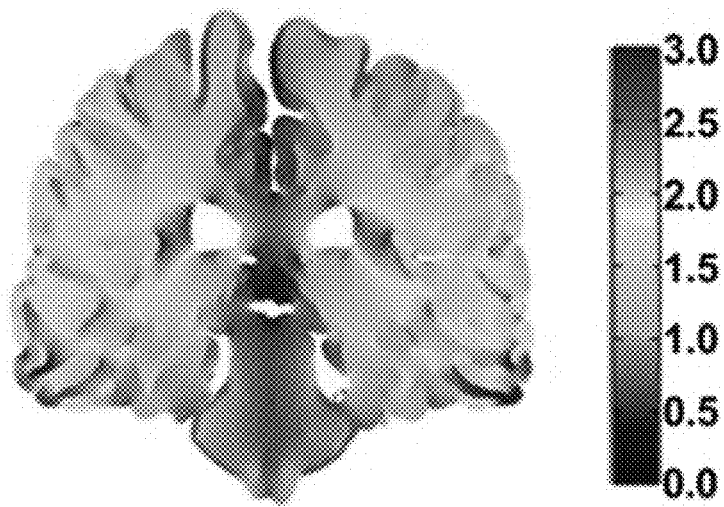
FIG. 7 illustrates electric field magnitude and distribution (in V/cm) shown in coronal view from a finite element method simulation model.

Additionally, by manipulating the configuration of paired transducer arrays, it is possible to achieve an almost tripling of electric field intensity to a particular region of the brain as shown in FIG. 7. FIG. 7 illustrates electric field magnitude and distribution (in V/cm) shown in the coronal view from a finite element method simulation model. This simulation employs a left-right paired transducer array configuration.

In an aspect, the patient modeling application 608 may be configured to determine a desired (e.g., optimal) transducer array layout for a patient based on the location and extent of the tumor. For example, initial morphometric head size measurements may be determined from the T1 sequences of a brain MRI, using axial and coronal views. Postcontrast axial and coronal MRI slices may be selected to demonstrate the maximal diameter of enhancing lesions.

Figure 8A:
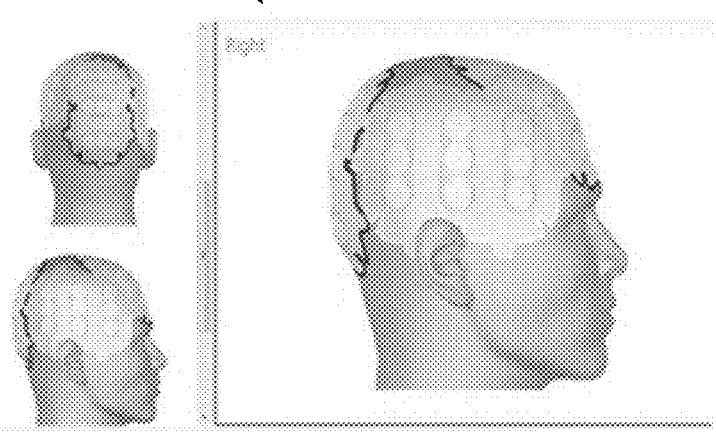
FIG. 8A shows a three-dimensional array layout map 800.
Figure 8B:
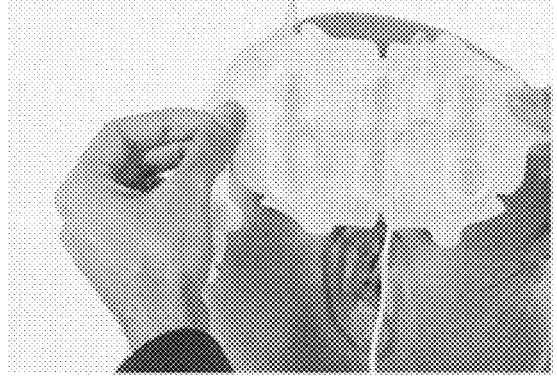
FIG. 8B shows the placement of transducer arrays on the scalp of a patient.

Employing measures of head size and distances from predetermined fiducial markers to tumor margins, varying permutations and combinations of paired array layouts may be assessed to generate the configuration which delivers maximal electric field intensity to the tumor site. As shown in FIG. 8A, the output may be a three-dimensional array layout map 800. The three-dimensional array layout map 800 may be used by the patient and/or caregiver in arranging arrays on the scalp during the normal course of TTFields therapy as shown in FIG. 8B.

In an aspect, the patient modeling application 608 can be configured to determine the three-dimensional array layout map for a patient. MRI measurements of the portion of the patient that is to receive the transducer arrays may be determined. By way of example, the MRI measurements may be received via a standard Digital Imaging and Communications in Medicine (DICOM) viewer. MRI measurement determination may be performed automatically, for example by way of artificial intelligence techniques, or may be performed manually, for example, by way of a physician.

Figure 9A:
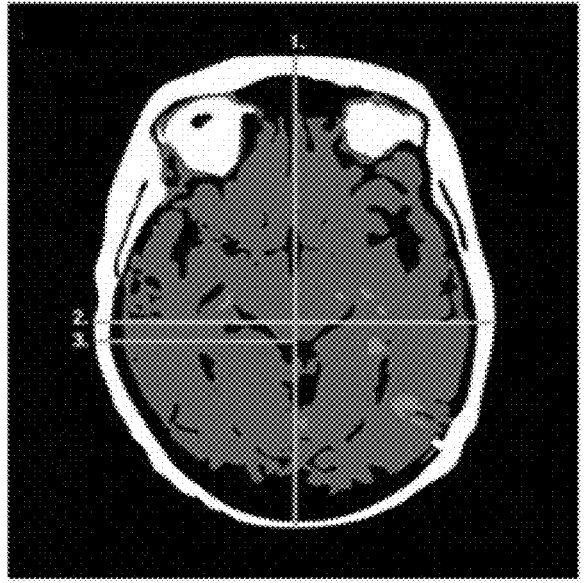
FIG. 9A shows an axial T1 sequence slice containing most apical image, including orbits used to measure head size.
Figure 9B:
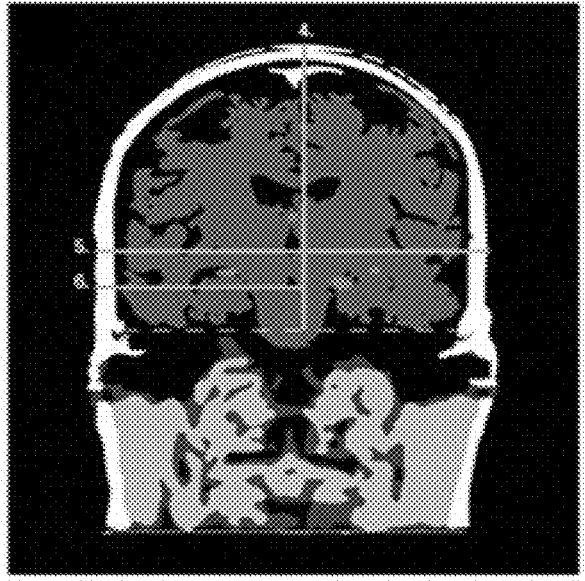
FIG. 9B shows a coronal T1 sequence slice selecting image at level of ear canal used to measure head size.
Figure 9C:
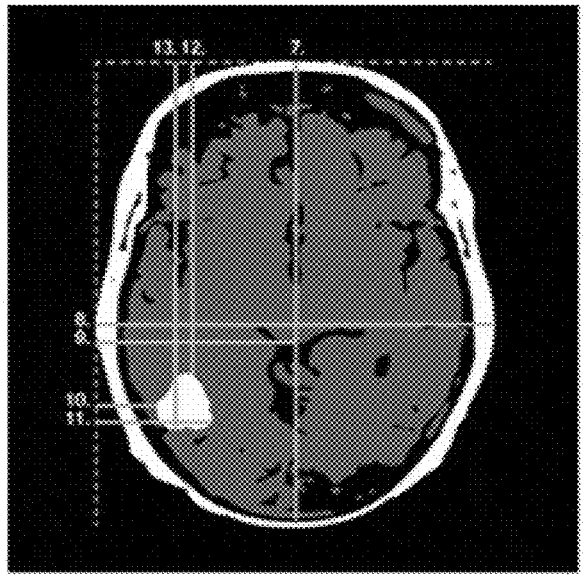
FIG. 9C shows a postcontrast T1 axial image shows maximal enhancing tumor diameter used to measure tumor location.
Figure 9D:
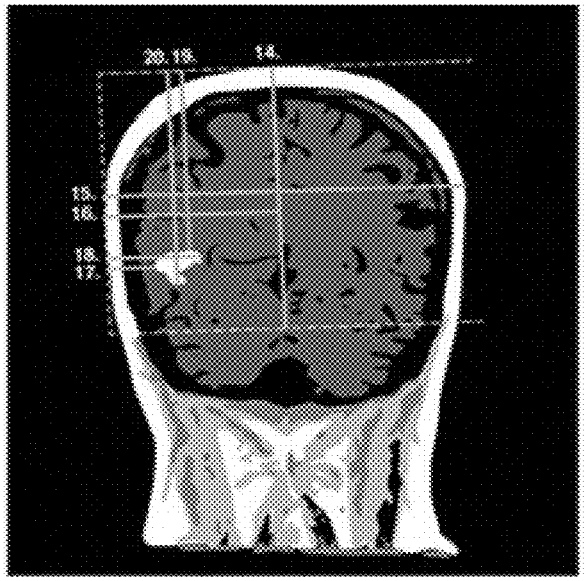
FIG. 9D shows a postcontrast T1 coronal image shows maximal enhancing tumor diameter used to measure tumor location.

Manual MRI measurement determination may comprise receiving and/or providing MRI data via a DICOM viewer. The MRI data may comprise scans of the portion of the patient that contains a tumor. By way of example, in the context of the head of a patient, the MRI data may comprise scans of the head that comprise one or more of a right frontotemporal tumor, a right parieto-temporal tumor, a left frontotemporal tumor, a left parieto-occipital tumor, and/or a multi-focal midline tumor. FIG. 9A, FIG. 9B, FIG. 9C, and FIG. 9D show example MRI data showing scans of the head of a patient. FIG. 9A shows an axial T1 sequence slice containing most apical image, including orbits used to measure head size. FIG. 9B shows a coronal T1 sequence slice selecting image at level of ear canal used to measure head size. FIG. 9C shows a postcontrast T1 axial image shows maximal enhancing tumor diameter used to measure tumor location. FIG. 9D shows a postcontrast T1 coronal image shows maximal enhancing tumor diameter used to measure tumor location. MRI measurements may commence from fiducial markers at the outer margin of the scalp and extend tangentially from a right-, anterior-, superior origin. Morphometric head size may be estimated from the axial T1 MRI sequence selecting the most apical image which still included the orbits (or the image directly above the superior edge of the orbits)

In an aspect, the MRI measurements may comprise, for example, one or more of, head size measurements and/or tumor measurements. In an aspect, one or more MRI measurements may be rounded to the nearest millimeter and may be provided to a transducer array placement module (e.g., software) for analysis. The MRI measurements may then be used to generate the three-dimensional array layout map (e.g., three-dimensional array layout map 800).

The MRI measurements may comprise one or more head size measurements such as: a maximal anteroposterior (A-P) head size, commencing measurement from the outer margin of the scalp; a maximal width of the head perpendicular to the A-P measurement: right to left lateral distance; and/or a distance from the far most right margin of the scalp to the anatomical midline.

The MRI measurements may comprise one or more head size measurements such as coronal view head size measurements. Coronal view head size measurements may be obtained on the T1 MRI sequence selecting the image at the level of the ear canal (FIG. 9B). The coronal view head size measurements may comprise one or more of: a vertical measurement from the apex of the scalp to an orthogonal line delineating the inferior margin of the temporal lobes; a maximal right to left lateral head width; and/or a distance from the far right margin of the scalp to the anatomical midline.

The MRI measurements may comprise one or more tumor measurements, such as tumor location measurements. The tumor location measurements may be made using T1 postcontrast MRI sequences, firstly on the axial image demonstrating maximal enhancing tumor diameter (FIG. 9C). The tumor location measurements may comprise one or more of: a maximal A-P head size, excluding the nose; a maximal right to left lateral diameter, measured perpendicular to the A-P distance; a distance from the right margin of the scalp to the anatomical midline; a distance from the right margin of the scalp to the closest tumor margin, measured parallel to the right-left lateral distance and perpendicular to the A-P measurement; a distance from the right margin of the scalp to the farthest tumor margin, measured parallel to the right-left lateral distance, perpendicular to the A-P measurement; a distance from the front of the head, measured parallel to the A-P measurement, to the closest tumor margin; and/or a distance from the front of the head, measured parallel to the A-P measurement, to the farthest tumor margin.

The one or more tumor measurements may comprise coronal view tumor measurements. The coronal view tumor measurements may comprise identifying the postcontrast T1 MRI slice featuring the maximal diameter of tumor enhancement (FIG. 9D). The coronal view tumor measurements may comprise one or more of: a maximal distance from the apex of the scalp to the inferior margin of the cerebrum. In anterior slices, this would be demarcated by a horizontal line drawn at the inferior margin of the frontal or temporal lobes, and posteriorly, it would extend to the lowest level of visible tentorium; a maximal right to left lateral head width; a distance from the right margin of the scalp to the anatomical midline; a distance from the right margin of the scalp to the closest tumor margin, measured parallel to the right-left lateral distance; a distance from the right margin of the scalp to the farthest tumor margin, measured parallel to the right-left lateral distance; a distance from the apex of the head to the closest tumor margin, measured parallel to the superior apex to inferior cerebrum line; and/or a distance from the apex of the head to the farthest tumor margin, measured parallel to the superior apex to inferior cerebrum line.

Other MRI measurements may be used, particularly when the tumor is present in another portion of the patient's body.

The MRI measurements may be used by the patient modeling application 608 to generate a patient model. The patient model may then be used to determine the three-dimensional array layout map (e.g., three-dimensional array layout map 800). When creating a patient model, the tumor may be segmented from the patient's MRI data (e.g., the one or more MRI measurements). Segmenting the MRI data identifies the tissue type in each voxel, and electric properties may be assigned to each tissue type based on empirical data. Table 1 shows standard electrical properties of tissues that may be used in simulations.

TABLE 1

| Tissue Type | Conductivity, S/m | Relative Permittivity |
|---|---|---|
| Scalp | 0.3 | 5000 |
| Skull | 0.08 | 200 |
| Cerebrospinal fluid | 1.79 | 110 |
| Gray matter | 0.25 | 3000 |
| White matter | 0.12 | 2000 |
| Enhancing tumor | 0.24 | 2000 |
| Enhancing nontumor | 0.36 | 1170 |
| Resection cavity | 1.79 | 110 |
| Necrotic tumor | 1 | 110 |
| Hematoma | 0.3 | 2000 |
| Ischemia | 0.18 | 2500 |
| Atrophy | 1 | 110 |
| Air | 0 | 0 |

In some instances, the patient modeling application 608 may use artificial intelligence and/or machine learning to associate dielectric properties with a patient model and/or determine dielectric (e.g., standard electrical properties, etc.) of tissues that may be used in simulations, numerical simulations of TTFields delivery to a patient. For example, medical images from a plurality of patients may be used to train the patient modeling application 608 (or any other predictive model) to map one or more dielectric properties (e.g., conductivity, relative permittivity, etc.) to a tissue type (e.g., combined skin and muscle tissue, skull/bone, cerebrospinal fluid, gray matter, white, tumor/cancerous tissue, etc.). The medical images may include images derived from magnetic resonance imaging (MRI), radiography, ultrasound, elastography, photoacoustic imaging, positron emission tomography, echocardiography, magnetic particle imaging, functional near-infrared spectroscopy, and/or any other imaging technique. The medical images may each include dielectric property information, such as conductivity values, at a set of points (e.g., different tissue locations, etc.). In some instances, the dielectric property information may be determined for (mapped to) each image by excising tissue samples from a patient associated with the image and measuring the dielectric properties of the tissue samples. Each location, area, and/or region of the patient's body from which a tissue sample is excised/collected may correlate, correspond, and/or be associated with the same location, area, and/or region of the patient's body represented in the image. Any technique may be used to track, correlate, correspond, and/or associate each location, area, and/or region of the patient's body from which a tissue sample is excised/collected and the same location, area, and/or region of the patient's body represented in the image, such as surgical navigation methods, and/or the like. Methods such as connected component labeling and/or the like may be used to map dielectric properties to different structures (e.g., tumors, etc.) and/or tissue types represented in a medical image. For example, a marker in an image, such as a voxel, pixel, and/or the like may be correlated to a point in a patient's anatomy from which a tissue sample is excised. The measured/determined dielectric/electrical properties of the tissue sample can form data/information that is associated with the marker voxel/pixel in the image. The contrast levels, for example of the marker voxel/pixel can be used to determine other voxels/pixels in the image associated with the marker voxel/pixel. The other voxels/pixels may represent the same tissue type represented by the marker voxel/pixel, such as gray matter, cerebral spinal fluid, and/or the like. The measured/determined dielectric/electrical properties associated with the marker voxel/pixel may also be associated with and/or used to label the other voxels/pixels in the image. The associated contrast levels of the marker voxel/pixel and the other voxels/pixels may be used to identify various tissue structures and/or types represented in the image.

The medical images, the associated dielectric properties determined for each image, and features extracted from each image may form datasets that may train a machine learning model (e.g., a predictive model, the patient modeling application 608, etc.) to map one or more dielectric properties (e.g., conductivity, relative permittivity, etc.) to a tissue type (e.g., combined skin and muscle tissue, skull/bone, cerebrospinal fluid, gray matter, white, tumor/cancerous tissue, etc.) represented in an image. Features may include, for example, intensity/color/illumination and/or any other component related features associated with each voxel (or pixel) of an image, texture maps/information, and/or geometrical features (e.g., volume, roundness, skewness, etc.) represented in an image (e.g., describing, for instance, the tumor, etc.). In some instances, features extracted from each image may indicate a specific area of a patient's body, such as a head or torso, where voxels are labeled to indicate segmentation of a tumor and different tissue types, such as: combined skin and muscle tissue, skull/bone, cerebrospinal fluid, gray matter, and white matter. Unlabeled voxels of the image may be considered air. It should be noted that the datasets (or large dataset) may be changed, modified, and/or the like to include any data relevant to computing electric fields for transducer array layouts. The features may include any features, data, and/or information extracted from the medical images. The machine learning model may be trained according to a multiple datasets (or a large dataset) created from dielectric property information and features from medical images from a wide variety of patients. The machine learning model may associate dielectric properties with a patient model.

Figure 10:
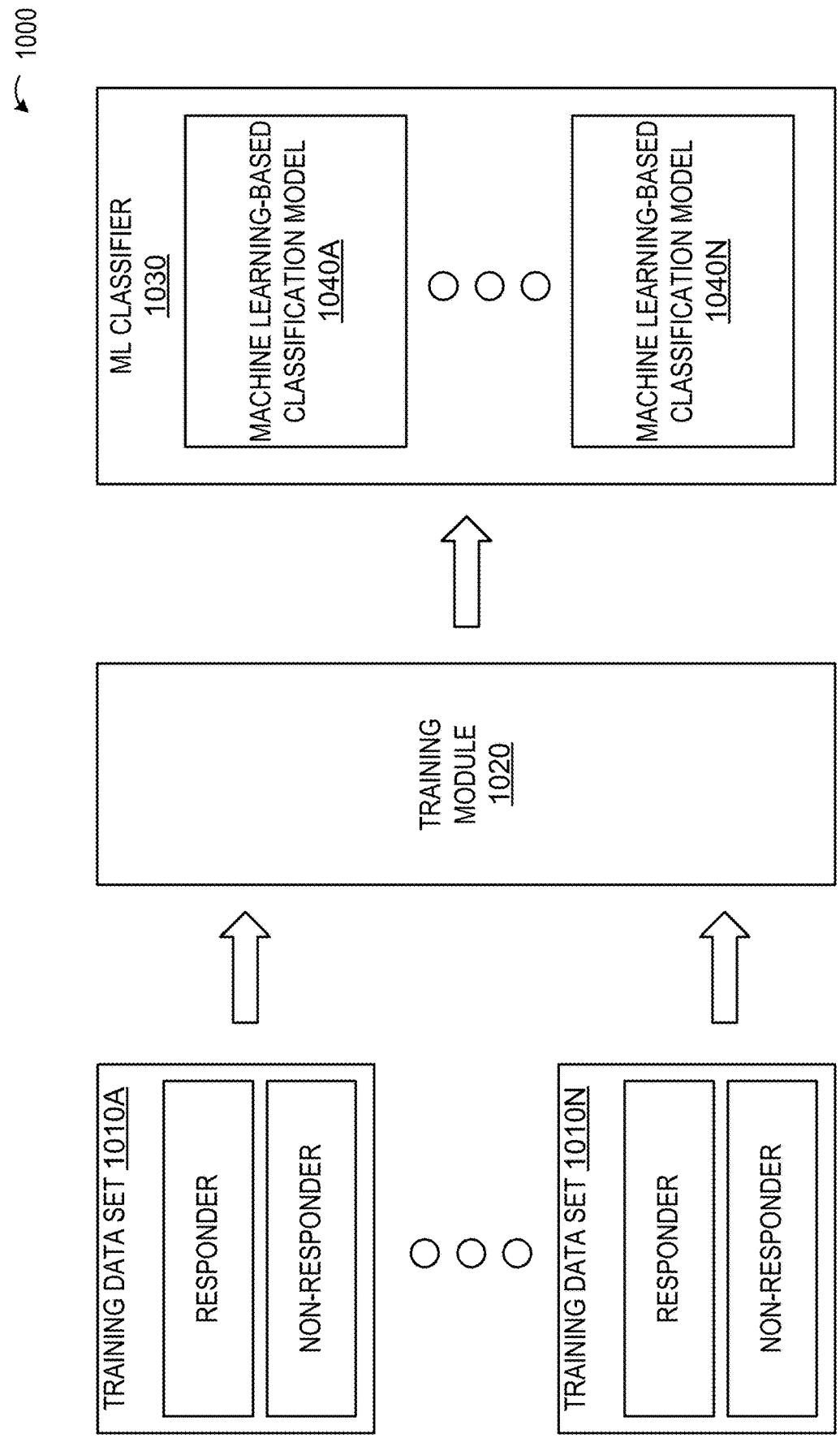
FIG. 10 shows an example machine learning system.

As shown in FIG. 10, a system 1000 may use machine learning techniques to train, based on an analysis of one or more training data sets 1010A-100N by a training module 1020, at least one machine learning-based classifier 1030 that is configured to classify features extracted from images (e.g., medical images, etc.), such as three-dimensional (3D) images, comprising a plurality of voxels. The images may include images derived from magnetic resonance imaging (MRI), radiography, ultrasound, elastography, photoacoustic imaging, positron emission tomography, echocardiography, magnetic particle imaging, functional near-infrared spectroscopy, and/or any other imaging technique. The machine learning-based classifier 1030 may classify features extracted from 3D MRI images to enable fast approximation of electric field distribution based on a predictive model.

The one or more training data sets 1010A-1010N may comprise labeled baseline data such as dielectric property information, intensity/color/illumination, and/or any other component related features associated with each voxel (or pixel) of an image, texture maps/information, and/or geometrical features (e.g., volume, roundness, skewness, etc.) represented in an image (e.g., describing, for instance, the tumor, etc.), and/or the like from a large volume of patient images. In some instances, the labeled baseline data may include labeled electric field distributions, transducer array positions that induce therapeutic tumor treating fields, and/or the like. The label data may include features extracted from images of any portion of the patients' body. The labeled baseline data may include any number of feature sets (labeled data that identifies extracted features). For example, voxels at a set of points (e.g., different tissue locations, etc.) of a 3D image may be labeled with dielectric property information, such as conductivity values. In some instances, the dielectric property information may be determined by excising tissue samples from a patient associated with an image at a set of points and measuring the dielectric properties of the tissue samples at different frequencies, such as a frequency range of 10 Hz to 20 GHz. Each location, area, and/or region of the patient's body from which a tissue sample is excised/collected may correlate, correspond, and/or be associated with the same location, area, and/or region of the patient's body represented in the image. Any technique may be used to track, correlate, correspond, and/or associate each location, area, and/or region of the patient's body from which a tissue sample is excised/collected and the same location, area, and/or region of the patient's body represented in the image, such as surgical navigation methods, and/or the like. Methods such as connected component labeling and/or the like may be used to map dielectric properties to different structures (e.g., tumors, etc.) and/or tissue types represented in a medical image. For example, a marker in an image, such as a voxel, pixel, and/or the like may be correlated to a point in a patient's anatomy from which a tissue sample is excised. The measured/determined dielectric/electrical properties of the tissue sample can form data/information that is associated with the marker voxel/pixel in the image. The contrast levels, for example of the marker voxel/pixel, can be used to determine other voxels/pixels in the image associated with the marker voxel/pixel. The other voxels/pixels may represent the same tissue type represented by the marker voxel/pixel, such as gray matter, cerebral spinal fluid, and/or the like. The measured/determined dielectric/electrical properties associated with the marker voxel/pixel may also be associated with and/or used to label the other voxels/pixels in the image. The associated contrast levels of the marker voxel/pixel and the other voxels/pixels may be used to identify various tissue structures and/or types represented in the image.

The labeled baseline data may be stored in one or more databases. Data for each patient may be randomly assigned to a training data set or a testing data set. In some implementations, the assignment of data to a training data set or a testing data set may not be completely random. In this case, one or more criteria may be used during the assignment, such as ensuring that similar numbers of patients with tissue samples excised and measured for dielectric properties for a given frequency range, such as from 10 Hz to 20 GHz and/or the like, may be used in each of the training and testing data sets. In general, any suitable method may be used to assign the data to the training or testing data sets.

The training module 1020 may train the machine learning-based classifier 1030 by extracting a feature set from the labeled baseline data according to one or more feature selection techniques. In some instances, the training module 1020 may further define the feature set obtained from the labeled baseline data by applying one or more feature selection techniques to the labeled baseline data in the one or more training data sets 1010A-1010N. The training module 1020 may extract a feature set from the training data sets 1010A-1110N in a variety of ways. The training module 1020 may perform feature extraction multiple times, each time using a different feature-extraction technique. In some instances, the feature sets generated using the different techniques may each be used to generate different machine learning-based classification models 1040. In an embodiment, the feature set with the highest quality metrics may be selected for use in training. The training module 1020 may use the feature set(s) to build one or more machine learning-based classification models 1040A-1040N that are configured to determine tissue types and/or map dielectric property information to tissue types represented in images.

In some instances, the training data sets 1010A-100N and/or the labeled baseline data may be analyzed to determine any dependencies, associations, and/or correlations between dielectric properties, tissue types, and frequency ranges in the training data sets 1010A-1010N and/or the labeled baseline data. The term "feature," as used herein, may refer to any characteristic of an item of data that may be used to determine whether the item of data falls within one or more specific categories. By way of example, the features described herein may comprise dielectric properties, tissue types (determined from samples at different points of a patient's body, etc.), frequency ranges, intensity/color/illumination and/or any other component related features associated with each voxel (or pixel) of an image, temperature information, texture maps/information, and/or geometrical features (e.g., volume, roundness, skewness, etc.) represented in an image (e.g., describing, for instance, the tumor, etc.), and/or the like.

In some instances, a feature selection technique may comprise one or more feature selection rules. The one or more feature selection rules may comprise a dielectric property and tissue type correlation/estimation rule. The dielectric property and tissue type correlation/estimation rule may comprise determining which features in the labeled baseline data appear over a threshold number of times in the labeled baseline data and identifying those features that satisfy the threshold as candidate features. For example, any feature that appears greater than or equal to 2 times in the labeled baseline data may be considered as candidate features. Any features appearing less than 2 times may be excluded from consideration as a feature. In some instances, a single feature selection rule may be applied to select features or multiple feature selection rules may be applied to select features. In some instances, the feature selection rules may be applied in a cascading fashion, with the feature selection rules being applied in a specific order and applied to the results of the previous rule. For example, the dielectric property and tissue type correlation/estimation rule may be applied to the labeled baseline data to generate conductivity maps for various tissue types represented in an image. A final list of candidate dielectric property and tissue type correlations, estimations, and/or identifications may be analyzed according to additional features.

In some instances, automatic determination of tissue types and/or mapping of dielectric property information to tissue types represented in images may be based a wrapper method. A wrapper method may be configured to use a subset of features and train a machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. In some instances, forward feature selection may be used to identify one or more candidate dielectric property and tissue type correlations, estimations, and/or identifications. Forward feature selection is an iterative method that begins with no feature in the machine learning model. In each iteration, the feature which best improves the model is added until the addition of a new variable does not improve the performance of the machine learning model. In an embodiment, backward elimination may be used to identify one or more candidate dielectric property and tissue type correlations, estimations, and/or identifications. Backward elimination is an iterative method that begins with all features in the machine learning model. In each iteration, the least significant feature is removed until no improvement is observed on the removal of features. In an embodiment, recursive feature elimination may be used to identify one or more candidate dielectric property and tissue type correlations, estimations, and/or identifications. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

In some instances, one or more candidate dielectric property and tissue type correlations, estimations, and/or identifications may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to square of the magnitude of coefficients.

After training module 1020 has generated a feature set(s), the training module 1020 may generate a machine learning-based predictive model 1040 based on the feature set(s). Machine learning-based predictive model may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

In an embodiment, the training module 1020 may use the feature sets extracted from the training data sets 1010A-1010N and/or the labeled baseline data to build a machine learning-based classification model 1040A-1040N to determine dielectric property and tissue type correlations, estimations, and/or identifications. In some examples, the machine learning-based classification models 1040A-1040N may be combined into a single machine learning-based classification model 1040. Similarly, the machine learning-based classifier 1030 may represent a single classifier containing a single or a plurality of machine learning-based classification models 1040 and/or multiple classifiers containing a single or a plurality of machine learning-based classification models 1040. Also, in some embodiments, the machine learning-based classifier 1030 may include each of the training data sets 1010A-1010N and/or each feature set extracted from the training data sets 1010A-810N and/or extracted from the labeled baseline data.

The extracted features and dielectric property information from the images may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 1030 may comprise a decision rule or a mapping that uses a transducer array layout for a candidate dielectric property and tissue type correlations, estimations, and/or identifications.

The dielectric property information and the machine learning-based classifier 1030 may be used to determine/map dielectric property and tissue type correlation, estimation, and/or identification distribution of the test samples in the test data set. In one example, the result for each test sample includes a confidence level that corresponds to a likelihood or a probability that the corresponding test sample belongs in the determined/mapped dielectric property and tissue type correlation, estimation, and/or identification. The confidence level may be a value between zero and one that represents a likelihood that the determined/mapped dielectric property and tissue type correlation, estimation, and/or identification is consistent with a computed value. Multiple confidence levels may be provided for each test sample and each candidate (approximated) dielectric property and tissue type correlation, estimation, and/or identification. A top-performing candidate dielectric property and tissue type correlation, estimation, and/or identification may be determined by comparing the result obtained for each test sample with a computed dielectric property and tissue type correlation, estimation, and/or identification for each test sample. In general, the top-performing candidate dielectric property and tissue type correlation, estimation, and/or identification will have results that closely match the computed dielectric property and tissue type correlation, estimation, and/or identification. The top-performing candidate dielectric property and tissue type correlation, estimation, and/or identification may be used for associating dielectric properties with a patient model.

Figure 11:
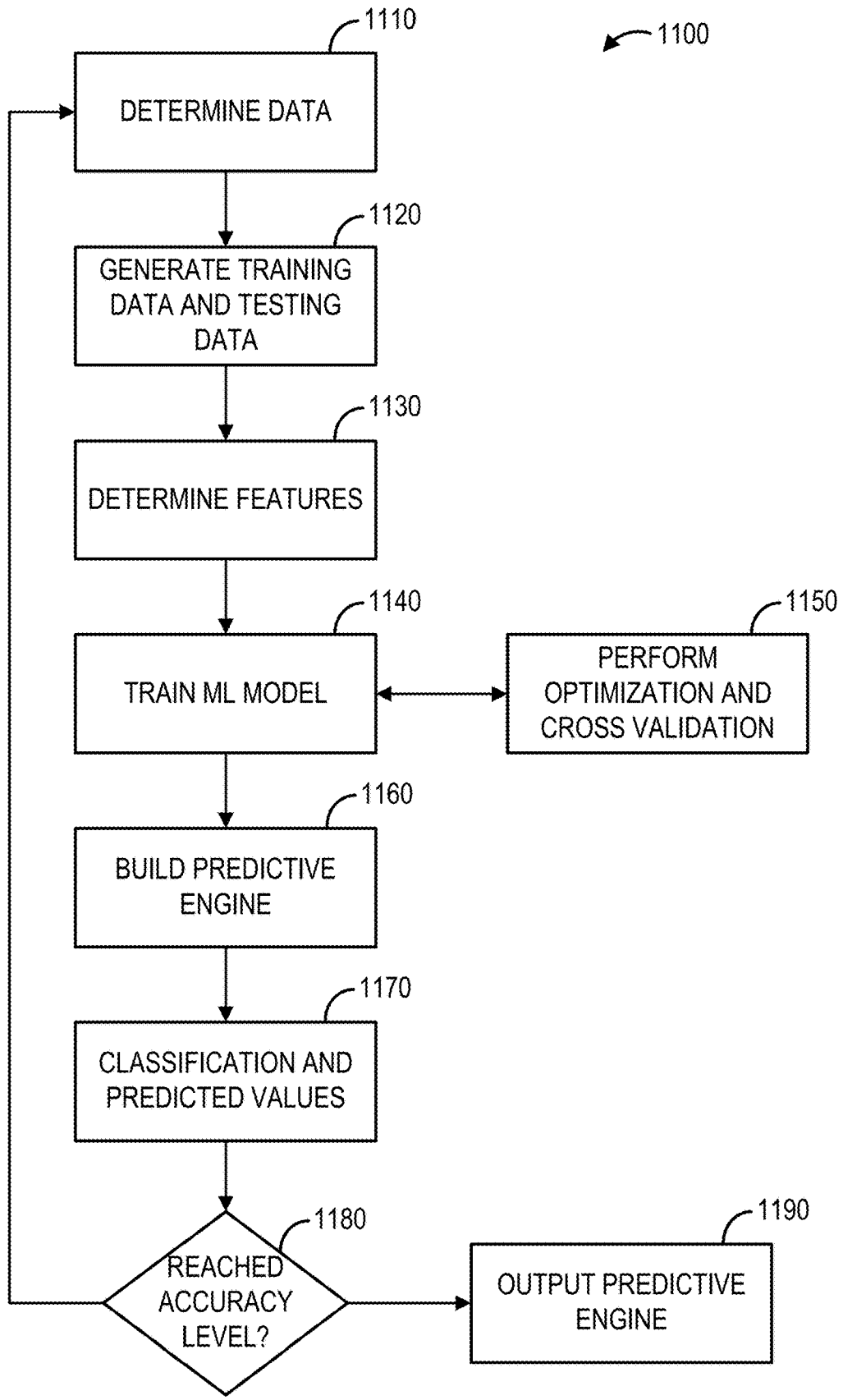
FIG. 11 shows an example machine learning method.

FIG. 11 is a flowchart illustrating an example training method 1100 for associating dielectric properties with a patient model using the training module 1120. The training module 1120 can implement supervised, unsupervised, and/or semi-supervised (e.g., reinforcement-based) machine learning-based classification models 1140. The method 1100 illustrated in FIG. 11 is an example of a supervised learning method; variations of this example of training method are discussed below, however, other training methods can be analogously implemented to train unsupervised and/or semi-supervised machine learning (predictive) models.

The training method 1100 may determine (e.g., access, receive, retrieve, etc.) 3D image data of one or more populations of patients at 1110. The 3D image data may be derived from any imaging technique/technology, such as magnetic resonance imaging (MRI), radiography, ultrasound, elastography, photoacoustic imaging, positron emission tomography, echocardiography, magnetic particle imaging, functional near-infrared spectroscopy, and/or the like. The data may contain one or more datasets, each dataset associated with dielectric/electric properties of tissues (e.g., combined skin and muscle tissue, skull/bone, cerebrospinal fluid, gray matter, and white matter, etc.) at different frequencies determined from various tissue samples from various locations of the bodies of a plurality of patients, pixel/voxel contrast and related component information, or any other feature relevant to associating dielectric properties to patient models. Each dataset may include labeled baseline data. Each dataset may further include labeled dielectric property information for different voxels/pixels based on contrast, coordinate, and/or any other component associated with the voxels/pixels. Each dataset may further include labeled texture maps/information, and/or geometrical features (e.g., volume, roundness, skewness, etc.) represented in an image (e.g., describing for instance the tumor, etc.).

The training method 1100 may generate, at 1120, a training data set and a testing data set. The training data set and the testing data set may be generated by mapping, associating, and/or correlating dielectric/electric property information determined from different tissue samples to different positions/areas of patients represented in images that correspond to the different positions/areas from with the tissue samples are taken/excised. In some instances, the training data set and the testing data set may be generated by randomly assigning dielectric/electric property and voxels/pixels correlation data to either the training data set or the testing data set. In some instances, the assignment of dielectric/electric property and voxels/pixels correlation data as training or test samples may not be completely random. In some instances, only the labeled baseline data for a specific feature extracted from the images (e.g., 3D images, etc.) may be used to generate the training data set and the testing data set. In some instances, a majority of the labeled baseline data extracted from images may be used to generate the training data set. For example, 75% of the labeled baseline data extracted from the images may be used to generate the training data set and 25% may be used to generate the testing data set. Any method or technique may be used to create the training and testing datasets.

The training method 1100 may determine (e.g., extract, select, etc.), at 1130, one or more features that can be used by, for example, a classifier label features extracted from a variety of images. The one or more features may be labeled dielectric property information for different voxels/pixels based on contrast, coordinate, and/or any other component associated with the voxels/pixels, labeled texture maps/information, geometrical features (e.g., volume, roundness, skewness, etc.) represented in an image (e.g., describing, for instance, the tumor, etc.), and/or any other data relevant to associating dielectric properties with a patient model. In an embodiment, the training method 1100 may determine a set of training baseline features from the training data set. Features of images may be determined by any method.

The training method 1100 may train one or more machine learning models using the one or more features at 1140. In some instances, the machine learning models may be trained using supervised learning. In another embodiment, other machine learning techniques may be employed, including unsupervised learning and semi-supervised. The machine learning models trained at 1140 may be selected based on different criteria and/or data available in the training data set. For example, machine learning classifiers can suffer from different degrees of bias. Accordingly, more than one machine learning model can be trained at 1140, optimized, improved, and cross-validated at 1150.

The training method 1100 may select one or more machine learning models to build a predictive model at 1160 (e.g., a machine learning classifier, a predictive model, etc.). The predictive engine may be evaluated using the testing data set. The predictive engine may analyze the testing data set and generate classification values and/or predicted values at 1170. Classification and/or prediction values may be evaluated at 1180 to determine whether such values have achieved a desired accuracy level. Performance of the predictive engine may be evaluated in a number of ways based on a number of true positives, false positives, true negatives, and/or false negatives classifications of the plurality of data points indicated by the predictive engine. For example, the false positives of the predictive engine may refer to a number of times the predictive engine incorrectly associated dielectric properties t a patient model. Conversely, the false negatives of the predictive engine may refer to a number of times the machine learning model associated dielectric properties t a patient model incorrectly, when in fact, the associated dielectric properties with the patient model match actual dielectric properties of a patient represented by the model. True negatives and true positives may refer to a number of times the predictive engine correctly associated dielectric properties with a patient model. Related to these measurements are the concepts of recall and precision. Generally, recall refers to a ratio of true positives to a sum of true positives and false negatives, which quantifies a sensitivity of the predictive engine. Similarly, precision refers to a ratio of true positives a sum of true and false positives.

When such a desired accuracy level is reached, the training phase ends and the predictive engine may be output at 1190; when the desired accuracy level is not reached, however, then a subsequent iteration of the training method 1100 may be performed starting at 1110 with variations such as, for example, considering a larger collection of tissue samples from a larger population of patients.

Continuing the example of a tumor within the head of a patient, a healthy head model may be generated which serves as a deformable template from which patient models can be created. The region of the tumor in the patient MRI data may be masked, and non-rigid registration algorithms may be used to register the remaining regions of the patient head on to a 3D discrete image representing the deformable template of the healthy head model. This process yields a non-rigid transformation that maps the healthy portion of the patient's head into the template space, as well as the inverse transformation that maps the template into the patient space. The inverse transformation is applied to the 3D deformable template to yield an approximation of the patient's head in the absence of a tumor. Finally, the tumor (referred to as a region-of-interest (ROI)) is planted back into the deformed template to yield the full patient model. The patient model may be a digital representation in three-dimensional space of the portion of the patient's body, including internal structures, such as tissues, organs, tumors, etc.

Once a three-dimensional array layout map has been determined for a patient, delivery of TTFields may then be simulated by the patient modeling application 608 using the patient model. Simulated electric field distributions, dosimetry, and simulation-based analysis are described in U.S. Patent Publication No. 20190117956 A1 and Publication "Correlation of Tumor treating Fields Dosimetry to Survival Outcomes in Newly Diagnosed Glioblastoma: A Large-Scale Numerical Simulation-based Analysis of Data from the Phase 3 EF-14 randomized Trial" by Ballo, et al. (2019) which are incorporated herein by reference in their entirety.

To ensure systematic positioning of the transducer arrays relative to the tumor location, a reference coordinate system may be defined. For example, a transversal plane may initially be defined by conventional LR and AP positioning of the transducer arrays. The left-right direction may be defined as the x-axis, the AP direction may be defined as the y-axis, and the craniocaudal direction normal to the XY-plane may be defined as the Z-axis.

After defining the coordinate system, transducer arrays may be virtually placed on the patient model with their centers and longitudinal axes in the XY-plane. A pair of transducer arrays may be systematically rotated around the z-axis of the head model, i.e. in the XY-plane, from 0 to 180 degrees, thereby covering the entire circumference of the head (by symmetry). The rotation interval may be, for example, 15 degrees, corresponding to approximately 2 cm translations, giving a total of twelve different positions in the range of 180 degrees. Other rotation intervals are contemplated. Electric field distribution calculations may be performed for each transducer array position relative to tumor coordinates.

Electric field distribution in the patient model may be determined by the patient modeling application 608 using a finite element (FE) approximation of electrical potential. In general, the quantities defining a time-varying electromagnetic field are given by the complex Maxwell equations. However, in biological tissues and at the low to intermediate frequency of TTFields (f=200 kHz), the electromagnetic wavelength is much larger than the size of the head and the electric permittivity F is negligible compared to the real-valued electric conductivity a, i.e., where $\omega=2\pi f$ is the angular frequency. This implies that the electromagnetic propagation effects and capacitive effects in the tissue are negligible, so the scalar electric potential may be well approximated by the static Laplace equation $\nabla \cdot (\sigma \nabla \phi)=0$, with appropriate boundary conditions at the electrodes and skin. Thus, the complex impedance is treated as resistive (i.e. reactance is negligible) and currents flowing within the volume conductor are, therefore, mainly free (Ohmic) currents. The FE approximation of Laplace's equation was calculated using the SimNIBS software (simnibs.org). Computations were based on the Galerkin method and the residuals for the conjugate gradient solver were required to be <1E-9. Dirichlet boundary conditions were used with the electric potential was set to (arbitrarily chosen) fixed values at each set of electrode arrays. The electric (vector) field was calculated as the numerical gradient of the electric potential and the current density (vector field) was computed from the electric field using Ohm's law. The potential difference of the electric field values and the current densities were linearly rescaled to ensure a total peak-to-peak amplitude for each array pair of 1.8 A, calculated as the (numerical) surface integral of the normal current density components over all triangular surface elements on the active electrode discs. This corresponds to the current level used for clinical TTFields therapy by the Optune® device. The "dose" of TTFields was calculated as the intensity (L2 norm) of the field vectors. The modeled current is assumed to be provided by two separate and sequentially active sources each connected to a pair of 3×3 transducer arrays. The left and posterior arrays may be defined to be sources in the simulations, while the right and anterior arrays were the corresponding sinks, respectively. However, as TTFields employ alternating fields, this choice is arbitrary and does not influence the results.

An average electric field strength generated by transducer arrays placed at multiple locations on the patient may be determined by the patient modeling application 608 for one or more tissue types. In an aspect, the transducer array position that corresponds to the highest average electric field strength in the tumor tissue type(s) may be selected as a desired (e.g., optimal) transducer array position for the patient. In another aspect, one or more candidate positions for a transducer array(s) may be excluded as a result of a physical condition of the patient. For example, one or more candidate positions may be excluded based on areas of skin irritation, scars, surgical sites, discomfort, etc. Accordingly, the transducer array position that corresponds to the highest average electric field strength in the tumor tissue type(s), after excluding one or more candidate positions, may be selected as a desired (e.g., optimal) transducer array position for the patient. Thus, a transducer array position may be selected that results in less than the maximum possible average electric field strength.

The patient model may be modified to include an indication of the desired transducer array position. The resulting patient model, comprising the indication(s) of the desired transducer array position(s), may be referred to as the three-dimensional array layout map (e.g., three-dimensional array layout map 600). The three-dimensional array layout map may thus comprise a digital representation, in three-dimensional space, of the portion of the patient's body, an indication of tumor location, an indication of a position for placement of one or more transducer arrays, combinations thereof, and the like.

The three-dimensional array layout map may be provided to the patient in a digital form and/or a physical form. The patient, and/or a patient caregiver, may use the three-dimensional array layout map to affix one or more transducer arrays to an associated portion of the patient's body (e.g., head).

Figure 12:
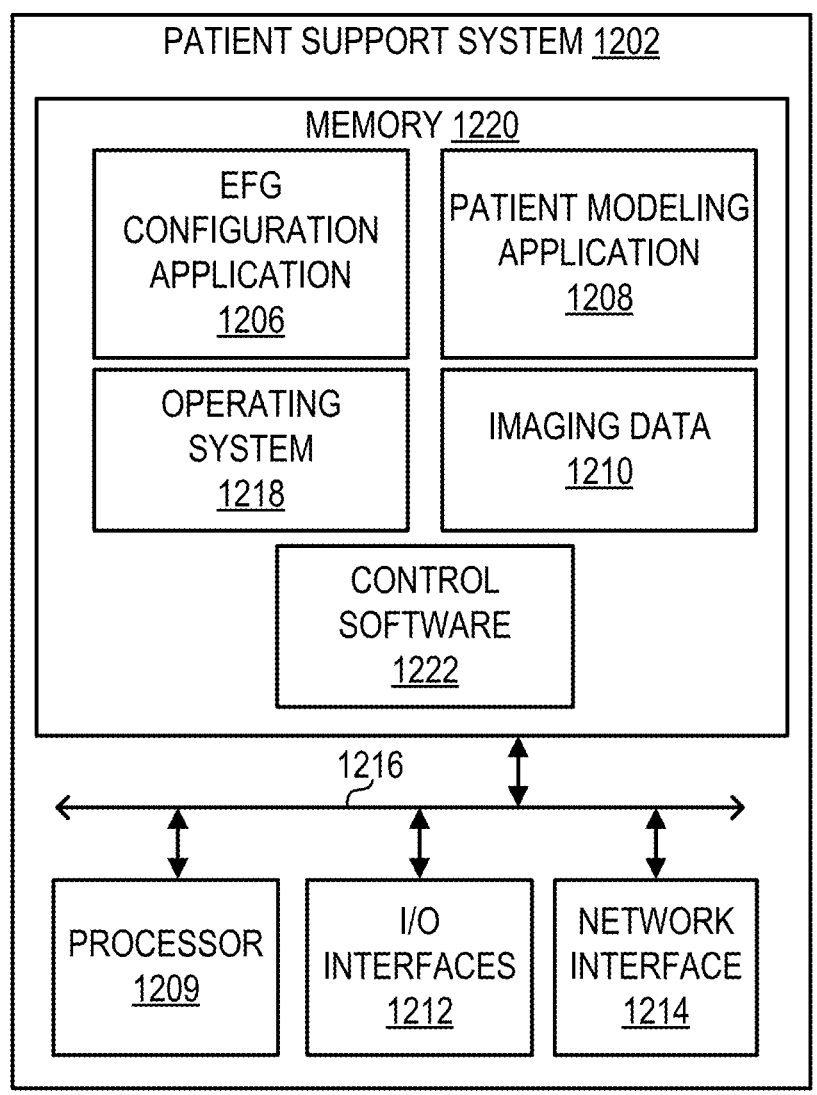
FIG. 12 is a block diagram depicting an example operating environment.

FIG. 12 is a block diagram depicting an environment 1200 comprising a non-limiting example of a patient support system 1202. In an aspect, some or all steps of any described method may be performed on a computing device as described herein. The patient support system 1202 can comprise one or multiple computers configured to store one or more of the EFG configuration application 606, the patient modeling application 608, the imaging data 610, and the like.

The patient support system 1202 can be a digital computer that, in terms of hardware architecture, generally includes a processor 1209, memory system 1220, input/output (I/O) interfaces 1212, and network interfaces 1214. These components (608, 610, 1212, and 1214) are communicatively coupled via a local interface 1216. The local interface 1216 can be, for example, but not limited to, one or more buses or other wired or wireless connections, as is known in the art. The local interface 1216 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1209 can be a hardware device for executing software, particularly that stored in memory system 1220. The processor 1209 can be any custom made or commercially available processor, a central processing unit (CPU), an auxiliary processor among several processors associated with the patient support system 1202, a semiconductor-based microprocessor (in the form of a microchip or chipset), or generally any device for executing software instructions. When the patient support system 1202 is in operation, the processor 1209 can be configured to execute software stored within the memory system 1220, to communicate data to and from the memory system 1220, and to generally control operations of the patient support system 1202 pursuant to the software.

The I/O interfaces 1212 can be used to receive user input from and/or for providing system output to one or more devices or components. User input can be provided via, for example, a keyboard and/or a mouse. System output can be provided via a display device and a printer (not shown). I/O interfaces 1212 can include, for example, a serial port, a parallel port, a Small Computer System Interface (SCSI), an IR interface, an RF interface, and/or a universal serial bus (USB) interface.

The network interface 1214 can be used to transmit and receive from the patient support system 1202. The network interface 1214 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 1214 may include address, control, and/or data connections to enable appropriate communications.

The memory system 1220 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1220 may incorporate electronic, magnetic, optical, and/or other types of storage media. Note that the memory system 1220 can have a distributed architecture, where various components are situated remote from one another, but can be accessed by the processor 1209.

The software in memory system 1220 may include one or more software programs, each of which comprises an ordered listing of executable instructions for implementing logical functions. In the example of FIG. 12, the software in the memory system 1220 of the patient support system 1202 can comprise the EFG configuration application 1206, the patient modeling application 608, the imaging data 1210, and a suitable operating system (O/S) 1218. The operating system 1218 essentially controls the execution of other computer programs, and provides scheduling, input-output control, file and data management, memory management, and communication control and related services.

For purposes of illustration, application programs and other executable program components such as the operating system 1218 are illustrated herein as discrete blocks, although it is recognized that such programs and components can reside at various times in different storage components of the patient support system 1202. An implementation of the EFG configuration application 606, the patient modeling application 608, the imaging data 610, and/or the control software 1220 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" can comprise volatile and non-volatile, removable and non-removable media implemented in any methods or technology for storage of information such as computer-readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an embodiment, illustrated in FIG. 13, one or more of the apparatus 100, the patient support system 602, the patient modeling application 608, the patient support system 1202, and/any other device/component described herein can be configured to perform a method 1300 comprising, at 1310, determining a plurality of sets of image data associated with a plurality of patients, wherein each patient is associated with a set of image data derived from imaging a portion of the patient, wherein each set of image data comprises a plurality of voxels, wherein each voxel of the plurality of voxels is labeled with dielectric property information. The dielectric property information may include conductivity information, relative permittivity, and/or the like. The plurality of sets of image data associated with the plurality of patients may comprise image data associated with one or more of magnetic resonance imaging (MRI), radiography, ultrasound, elastography, photoacoustic imaging, positron emission tomography, echocardiography, magnetic particle imaging, or functional near-infrared spectroscopy.

In some instances, determining the dielectric property information (and/or electric property information) may include receiving, from each patient of the plurality of patients, a plurality of samples of tissues, wherein each sample of tissue of the plurality of samples of tissue is from a different location of the portion of the patient, wherein each location is associated with a different region of the portion of the patient, wherein each location corresponds to a voxel of the plurality of voxels of the set of image data associated with the patient. Determining, for each sample of tissue of the plurality of samples of tissue from each patient, based on one or more measured properties of the sample tissue, dielectric properties. Labeling, based on determining the dielectric properties for each sample of tissue of the plurality of samples of tissue from each patient, the corresponding voxel of the respective the set of image data with the dielectric property information, and labeling, for each voxel of the respective the set of image data labeled with the dielectric property information, based on connected-component labeling, one or more voxels within the region associated with the voxel with dielectric property information (and/or electric property information) that matches the labeled dielectric property information (and/or electric property information) of the voxel.

At 1320, determining, based on a first portion of the plurality of sets of image data and the dielectric property information associated with each voxel of the plurality of voxels that correspond to the first portion of the plurality of sets of image data, a plurality of features for a predictive model. In some instances, determining the plurality of features for the predictive model may include determining the plurality of features for the predictive model based on a feature selection technique comprising one or more of a filter method, a wrapper method, or an embedded method.

At 1330, training, based on the plurality of features and the first portion of the plurality of sets of image data, the predictive model, wherein the predictive model is configured to determine dielectric property information for each voxel of a plurality of voxels associated with an image. For example, training, based on the plurality of features and the first portion of the plurality of sets of image data, the predictive model may comprise a machine learning technique comprising one or more of discriminant analysis, a decision tree, a nearest neighbor (NN) algorithm (e.g., k-NN models, replicator NN models, etc.), a statistical algorithm (e.g., Bayesian networks, etc.), a clustering algorithm (e.g., k-means, mean-shift, etc.), neural networks (e.g., reservoir networks, artificial neural networks, etc.), support vector machines (SVMs), logistic regression algorithms, linear regression algorithms, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, combinations thereof, and/or the like.

At 1340 testing, based on a second portion of the plurality of sets of image data, the predictive model.

At 1350, outputting, based on the testing, the predictive model. For example, the predictive model may be used to associate dielectric properties with a patient model. In some instances, the method 1300 may include using the predictive model to associate dielectric properties with a patient model.

In an embodiment, illustrated in FIG. 14, one or more of the apparatus 100, the patient support system 602, the patient modeling application 608, the patient support system 1202, and/any other device/component described herein can be configured to perform a method 1400 comprising, at 1410, determining, for a patient, a set of image data, wherein the set of image data comprises a plurality of voxels. The set of image data may include image data associated with one or more of magnetic resonance imaging (MRI), radiography, ultrasound, elastography, photoacoustic imaging, positron emission tomography, echocardiography, magnetic particle imaging, functional near-infrared spectroscopy, and/or any other imaging technique/technology.

At 1420, presenting, to a predictive model trained to determine dielectric property information for each voxel of a plurality of voxels associated with an image, the image data set.

At 1430, determining, by the predictive model, dielectric property information for each voxel of a plurality of voxels associated with the image data set.

In view of the described apparatuses, systems, and methods and variations thereof, hereinbelow are described certain more particularly described embodiments of the invention. These particularly recited embodiments should not however be interpreted to have any limiting effect on any different claims containing different or more general teachings described herein, or that the "particular" embodiments are somehow limited in some way other than the inherent meanings of the language literally used therein.

Embodiment 1: A method comprising: determining a plurality of sets of image data associated with a plurality of patients, wherein each patient is associated with a set of image data derived from imaging a portion of the patient, wherein each set of image data comprises a plurality of voxels, wherein each voxel of the plurality of voxels is labeled with dielectric property information, determining, based on a first portion of the plurality of sets of image data and the dielectric property information associated with each voxel of the plurality of voxels that correspond to the first portion of the plurality of sets of image data, a plurality of features for a predictive model, training, based on the plurality of features and the first portion of the plurality of sets of image data, the predictive model, wherein the predictive model is configured to determine dielectric property information for each voxel of a plurality of voxels associated with an image;
testing, based on a second portion of the plurality of sets of image data, the predictive model, and outputting, based on the testing, the predictive model.

Embodiment 2: The embodiment as in any one of the preceding embodiments further comprising receiving, from each patient of the plurality of patients, a plurality of samples of tissues, wherein each sample of tissue of the plurality of samples of tissue is from a different location of the portion of the patient, wherein each location is associated with a different region of the portion of the patient, wherein each location correspond to a voxel of the plurality of voxels of the set of image data associated with the patient, determining, for each sample of tissue of the plurality of samples of tissue from each patient, based on one or more measured properties of the sample tissue, dielectric properties, labeling, based on determining the dielectric properties for each sample of tissue of the plurality of samples of tissue from each patient, the corresponding voxel of the respective the set of image data with the dielectric property information, and labeling, for each voxel of the respective the set of image data labeled with the dielectric property information, based on connected-component labeling, one or more voxels within the region associated with the voxel with dielectric property information that matches the labeled dielectric property information of the voxel.

Embodiment 3: The embodiment as in any one of the preceding embodiments, wherein the dielectric property information comprises one or more of conductivity information or relative permittivity information.

Embodiment 4: The embodiment as in any one of the preceding embodiments, wherein the plurality of sets of image data associated with the plurality of patients comprise image data associated with one or more of magnetic resonance imaging (MRI), radiography, ultrasound, elastography, photoacoustic imaging, positron emission tomography, echocardiography, magnetic particle imaging, or functional near-infrared spectroscopy.

Embodiment 5: The embodiment as in any one of the preceding embodiments, further comprising determining, for a new patient, a new set of image data, wherein the new set of image data comprises a plurality of voxels, presenting, to the predictive model, the new image data set, and determining, by the predictive model, for each voxel of the plurality of voxels of the new set of image data, dielectric property information.

Embodiment 6: The embodiment as in any one of the preceding embodiments, wherein determining the plurality of features for the predictive model comprises determining the plurality of features for the predictive model based on a feature selection technique comprising one or more of a filter method, a wrapper method, or an embedded method.

Embodiment 7: The embodiment as in any one of the preceding embodiments wherein training the predictive model comprises a machine learning technique comprising one or more of discriminant analysis, a decision tree, a nearest neighbor (NN) algorithm (e.g., k-NN models, replicator NN models, etc.), a statistical algorithm (e.g., Bayesian networks, etc.), a clustering algorithm (e.g., k-means, mean-shift, etc.), neural networks (e.g., reservoir networks, artificial neural networks, etc.), support vector machines (SVMs), logistic regression algorithms, linear regression algorithms, Markov models or chains, principal component analysis (PCA) (e.g., for linear models), multi-layer perceptron (MLP) ANNs (e.g., for non-linear models), replicating reservoir networks (e.g., for non-linear models, typically for time series), or random forest classification.

Embodiment 8: The embodiment as in any one of the preceding embodiments further comprising determining, for each voxel of the plurality of voxels of the new image data set, a tissue type, and determining, for each voxel of the plurality of voxels of the new image data set, a conductivity value, a permittivity value, a distance to a closest transducer array, and a distance to a closest conductive material.

Embodiment 9: The embodiment as in any one of the preceding embodiments further comprising using the predictive model.

Embodiment 10: A method comprising: determining, for a patient, a set of image data, wherein the set of image data comprises a plurality of voxels, presenting, to a predictive model trained to determine dielectric property information for each voxel of a plurality of voxels associated with an image, the image data set, and determining, by the predictive model, dielectric property information for each voxel of a plurality of voxels associated with the image data set.

Embodiment 11: The embodiment as in embodiment 10, wherein the predictive model utilizes one or more of a decision tree, a statistical algorithm, or a neural network.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, for one patient of a plurality of patients, a plurality of samples of tissues, wherein each sample of tissue of the plurality of samples of tissue is from a different location of the one patient;
determining a plurality of sets of image data associated with the plurality of patients, wherein each patient is associated with a set of image data derived from imaging a portion of the patient, wherein each set of image data comprises a plurality of voxels;
labeling at least one voxel of the set of image data associated with the one patient of the plurality of patients with dielectric property information based on measured dielectric properties of a sample of tissue of the plurality of samples of tissues of the one patient;
determining, based on a first portion of the plurality of sets of image data and the dielectric property information associated with each voxel of the plurality of voxels that correspond to the first portion of the plurality of sets of image data, a plurality of features for a predictive model;
training, based on the plurality of features and the first portion of the plurality of sets of image data, the predictive model, wherein the predictive model is configured to determine dielectric property information for each voxel of a plurality of voxels associated with an image;
testing, based on a second portion of the plurality of sets of image data, the predictive model; and
outputting, based on the testing, the predictive model.

2. The method of claim 1,
wherein each location of the one patient is associated with a different region of the portion of the patient, wherein each location of the one patient corresponds to a voxel of the plurality of voxels of the set of image data associated with the patient, the method further comprising:
determining, for each sample of tissue of the plurality of samples of tissue from each patient, based on one or more measured properties of the sample tissue, dielectric properties;
labeling, based on determining the dielectric properties for each sample of tissue of the plurality of samples of tissue from each patient, the corresponding voxel of the respective the set of image data with the dielectric property information; and
labeling, for each voxel of the respective the set of image data labeled with the dielectric property information, based on connected-component labeling, one or more voxels within the region associated with the voxel with dielectric property information that matches the labeled dielectric property information of the voxel.

3. The method of claim 1, wherein the dielectric property information comprises one or more of conductivity information or relative permittivity information.

4. The method of claim 1, wherein the plurality of sets of image data associated with the plurality of patients comprise image data associated with one or more of magnetic resonance imaging (MRI), radiography, ultrasound, elastography, photoacoustic imaging, positron emission tomography, echocardiography, magnetic particle imaging, or functional near-infrared spectroscopy.

5. The method of claim 1, further comprising:
determining, for a new patient, a new set of image data, wherein the new set of image data comprises a plurality of voxels;
presenting, to the predictive model, the new image data set; and
determining, by the predictive model, for each voxel of the plurality of voxels of the new set of image data, dielectric property information.

6. The method of claim 1, wherein determining the plurality of features for the predictive model comprises determining the plurality of features for the predictive model based on a feature selection technique comprising one or more of a filter method, a wrapper method, or an embedded method.

7. The method of claim 1, wherein training the predictive model comprises one or more of discriminant analysis, a decision tree, a statistical algorithm, or a neural network.

8. A method of using the predictive model of claim 1.

9. An apparatus comprising:
one or more processors; and
memory storing processor-executable instructions that, when executed by the one or more processors, cause the apparatus to:
receive, for one patient of a plurality of patients, a plurality of samples of tissues, wherein each sample of tissue of the plurality of samples of tissue is from a different location of the one patient;
determine a plurality of sets of image data associated with the plurality of patients, wherein each patient is associated with a set of image data derived from imaging a portion of the patient, wherein each set of image data comprises a plurality of voxels;
label at least one voxel of the set of image data associated with the one patient of the plurality of patients with dielectric property information based on measured dielectric properties of a sample of tissue of the plurality of samples of tissues of the one patient;
determine, based on a first portion of the plurality of sets of image data and the dielectric property information associated with each voxel of the plurality of voxels that correspond to the first portion of the plurality of sets of image data, a plurality of features for a predictive model;
train, based on the plurality of features and the first portion of the plurality of sets of image data, the predictive model, wherein the predictive model is configured to determine dielectric property information for each voxel of a plurality of voxels associated with an image;
test, based on a second portion of the plurality of sets of image data, the predictive model; and
output, based on the testing, the predictive model.

10. The apparatus of claim 9, wherein each location of the one patient is associated with a different region of the portion of the patient, wherein each location of the one patient corresponds to a voxel of the plurality of voxels of the set of image data associated with the patient, wherein the processor-executable instructions, when executed by the one or more processors, further cause the apparatus to:
determine, for each sample of tissue of the plurality of samples of tissue from each patient, based on one or more measured properties of the sample tissue, dielectric properties;
label, based on determining the dielectric properties for each sample of tissue of the plurality of samples of tissue from each patient, the corresponding voxel of the respective the set of image data with the dielectric property information; and
label, for each voxel of the respective the set of image data labeled with the dielectric property information, based on connected-component labeling, one or more voxels within the region associated with the voxel with dielectric property information that matches the labeled dielectric property information of the voxel.

11. The apparatus of claim 9, wherein the dielectric property information comprises one or more of conductivity information or relative permittivity information.

12. The apparatus of claim 9, wherein the plurality of sets of image data associated with the plurality of patients comprise image data associated with one or more of magnetic resonance imaging (MRI), radiography, ultrasound, elastography, photoacoustic imaging, positron emission tomography, echocardiography, magnetic particle imaging, or functional near-infrared spectroscopy.

13. The apparatus of claim 9, wherein the processor-executable instructions, when executed by the one or more processors, further cause the apparatus to:
determine, for a new patient, a new set of image data, wherein the new set of image data comprises a plurality of voxels;
present, to the predictive model, the new image data set; and
receive, from the predictive model, for each voxel of the plurality of voxels of the new set of image data, dielectric property information.

14. The apparatus of claim 9, wherein the processor-executable instructions that, when executed by the one or more processors, cause the apparatus to determine the plurality of features for the predictive model further cause the apparatus to determine the plurality of features for the predictive model based on a feature selection technique comprising one or more of a filter method, a wrapper method, or an embedded method.

15. The apparatus of claim 9, wherein the processor-executable instructions that, when executed by the one or more processors, cause the apparatus to train the predictive model further cause the apparatus to train the predictive model based on a machine learning technique comprising one or more of: discriminant analysis, a decision tree, a statistical algorithm, or a neural network.

16. A method comprising:
determining, for a patient, a set of image data, wherein the set of image data comprises a plurality of voxels;
presenting, to a predictive model trained with at least one voxel of another patient of a plurality of patients, the at least one voxel labeled with dielectric property information based on measured dielectric properties of a sample of tissue of a plurality of samples of tissues of the another patient of the plurality of patients to determine dielectric property information for each voxel of a plurality of voxels associated with an image, the set of image data; and
determining, by the predictive model, dielectric property information for each voxel of the plurality of voxels associated with the set of image data.

17. The method of claim 16, wherein the set of image data comprises image data associated with one or more of magnetic resonance imaging (MRI), radiography, ultrasound, elastography, photoacoustic imaging, positron emission tomography, echocardiography, magnetic particle imaging, or functional near-infrared spectroscopy.

18. The method of claim 16, wherein the predictive model comprises one or more of: discriminant analysis, a decision tree, a statistical algorithm, or a neural network.

19. The method of claim 16, further comprising training, based on a plurality of features from a plurality of sets of image data, the predictive model.

20. The method of claim 19, further comprising determining, based on a feature selection technique comprising one or more of a filter method, a wrapper method, or an embedded method, the plurality of features.

* * * * *